United States Patent
Park et al.

(10) Patent No.: US 7,228,071 B2
(45) Date of Patent: Jun. 5, 2007

(54) WAVELENGTH DIVISION MULTIPLEXING OPTICAL SWITCHING SYSTEM

(75) Inventors: Se-Kang Park, Songnam-shi (KR); Ki-Cheol Lee, Suwon-shi (KR); Sang-Hyun Doh, Hwasong-shi (KR); Yun-Je Oh, Yongin-shi (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 781 days.

(21) Appl. No.: 10/446,463

(22) Filed: May 28, 2003

(65) Prior Publication Data
US 2004/0071160 A1  Apr. 15, 2004

(30) Foreign Application Priority Data
Oct. 11, 2002  (KR) .................. 10-2002-0062140

(51) Int. Cl.
*H04J 14/02* (2006.01)
(52) U.S. Cl. ........................................................ 398/49
(58) Field of Classification Search ............ 398/48–51
See application file for complete search history.

(56) References Cited

U.S. PATENT DOCUMENTS 6,005,698 A * 12/1999 Huber et al. .................. 398/50
6,810,211 B1 * 10/2004 Castanon ..................... 398/47

* cited by examiner

*Primary Examiner*—Leslie Pascal
(74) *Attorney, Agent, or Firm*—Cha & Reiter, L.L.C.

(57) ABSTRACT

Disclosed is a wavelength division multiplexing optical switching system, which is connected with a plurality of nodes of an optical network and supports communication between the nodes. The optical switching system includes a wavelength division demultiplexing unit which demultiplexes optical signals received from each of the plurality of nodes and outputs them as channels with different wavelengths. A routing unit which classifies the channels in accordance with destinations thereof. A fixed wavelength converting unit which converts the classified channels into channels of a single wavelength, the single wavelength being allocated in accordance with corresponding starting places. A wavelength division multiplexing unit which collects the wavelength-converted channels in accordance with destinations and then outputs them as multiplexed optical signals.

15 Claims, 24 Drawing Sheets

WAVELENGTH DIVISION MULTIPLEXING OPTICAL SWITCHING SYSTEM

CLAIM OF PRIORITY

This application claims priority to an application entitled "Wavelength Division Multiplexing Optical Switching System", filed with the Korean Intellectual Property Office on Oct. 11, 2002 and assigned Serial No. 2002-62140, the contents of which are hereby incorporated by reference.

BACKGROUND OF THE INVENTION

1. Field of the Invention

The present invention relates to an optical network provided with a plurality of nodes, and in particular to an optical switching system provided in an optical network to support communication between the nodes.

2. Description of the Related Art

Optical switching systems have been developed to exchange data traffic, such as IP packets and Ethernet frames, in order to overcome the limitations of conventional electric switching systems in speed and capacity.

Due to the explosive increase of Internet users, it is expected that data traffic will reach several Tb/s to tens of Tb/s in the future. In order to accommodate this, transmission networks are constructed based on a Dense-Wavelength-Division-Multiplexing (DWDM) mode. However, switching networks are still constructed based on electric switching systems, which are not easy to match w ith the D WDM optical transmission network. The switching capacity of electrical switching systems is limited to hundreds Gb/s or less due to the limitations in processing speed or the like of electric components. In addition, electric switching systems electrically convert and process not only dropped data, but also path-through data traffic. Therefore, the hardware becomes larger and more complex. In order to solve this problem, an OPDM (Optical Add/Drop Multiplexer) has been used, but is limted in that it cannot effectively use a bandwidth of an optical signal in an environment where data traffic is bursty.

Accordingly, in order to overcome the limitations in speed and capacity of conventional electric switching systems and to maximize the utilization of a bandwidth of an optical signal, optical switching systems have been researched, which exchange optical signals in terms of optical packet, burst or frame in an all-optical domain without electrically converting optical signals. One example of previously proposed optical switching systems is a broadcasting and selection mode switching system, which solves the problem of collisions between optical frames by performing a switching function using a beam splitter and an optical gate switch, then delaying the optical frames using a plurality of fiber optic delay lines.

A wavelength routing m ode system has been also proposed, which performs switching functions by converting a wavelength of an input optical frame at high speed according to an AWG (Arrayed Waveguide Grating) routing table using a high-speed variable wavelength converter and an AWG. This solves the problem of collisions by additionally using a high-speed wavelength converter, an optical delay line, and a wavelength division multiplexer/demultiplexer. Most of the proposed optical switching systems employ a high-speed variable wavelength converter in order to implement a switching function and an anti-collision function of optical packets, bursts or the like.

The wavelength converting speed of the above-mentioned systems are merely hundreds of µs to thousands of µs. Thus, these systems are not suitable for an optical switching system in which a switching speed in the range of several ns to tens of ns is required. A variable wavelength converter with a wavelength converting speed of several ns has been reported. However, there is a fundamental limitation in applying such a variable wavelength converter to an optical switching system because its wavelength has a variable width, which is limited and a time of tens of µs or more is needed for stabilization due to practical variations of the wavelength. There is also a problem in that because conventional optical systems require a number of variable wavelength converters, the hardware of those systems becomes very complex. When capacity expansion of an optical switching network is required, it is necessary that some wavelengths are added or the number of input and output links is increased. However, the previously proposed systems also reveal the limitations in expandability based on wavelength addition, increase of input and output links. Thus, these systems have a disadvantage in accommodating increasing capacity which is required by a network. In addition, in order to avoid collisions of optical data, a large number of fiber optic delay lines are needed, thereby further increasing complication and revealing a disadvantage in expansion of optical buffers when the capacity of optical buffers is required to be expanded. Furthermore, because most of the conventional systems employ a centralized system, there is a problem in that the control of optical switching systems is very complicated.

SUMMARY OF THE INVENTION

One aspect of the present invention is to provide an optical switching system that does not employ a variable wavelength converter, thereby reducing the complexity of hardware and overcoming the fundamental limitations in switching speed of a variable wavelength converter.

Another aspect of the present invention is to provide an optical switching system, which allows the number of wavelengths and the number of input and output links to be increased while maintaining an existing internal construction of an optical switching system when it is necessary to increase the capacity of an optical switching network.

Another aspect of the present invention is to provide an optical switching system, which can solve the collision problem between optical packets, bursts or frames and in which the expansion of optical buffers can be easily performed.

Still, another asepct of the present invention is to provide an optical switching system, of which the control method can be simplified and the complexity can be reduced.

Yet, another asepct of the present invention is to provide a wavelength division multiplexing optical switching system, which is connected with a plurality of nodes of an optical network and supports communication between the nodes. The optical switching system includes a wavelength division demultiplexing unit which demultiplexes optical signals received from each of the plurality of nodes and outputs these signals as channels with different wavelengths. A routing unit which classifies the channels in accordance with destinations thereof. A fixed wavelength converting unit which converts the classified channels into channels having a single wavelength allocated according to corresponding starting places thereof. A wavelength division multiplexing unit which collects the wavelength-converted channels in accordance with destinations and outputs them as multiplexed optical signals.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. For the purposes of clarity and simplicity, a detailed description of known functions and configurations incorporated herein will be omitted as it may make the subject matter of the present invention rather unclear.

Figure 1:
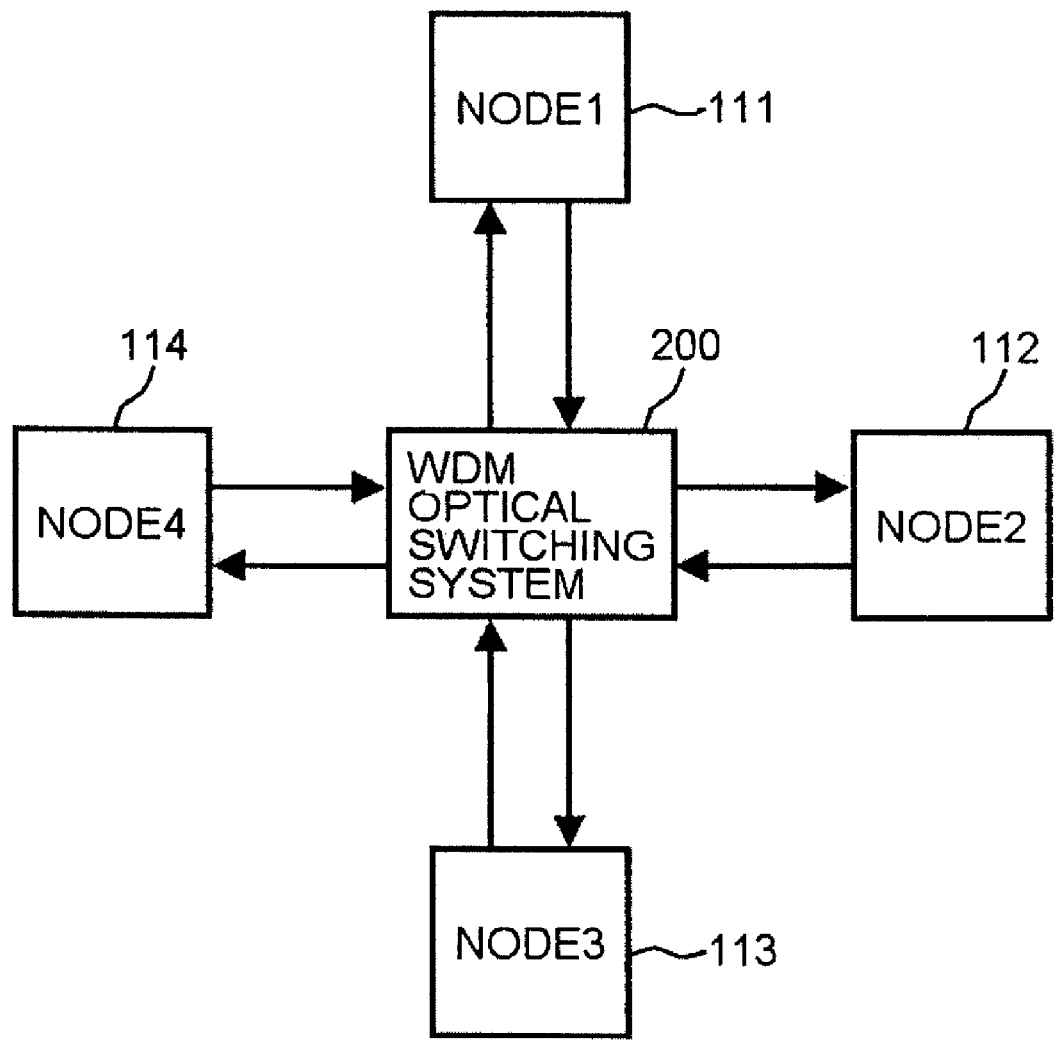
FIG. 1 shows the entire construction of an optical network provided with a wavelength division multiplexing optical switching system in accordance with the present invention.

FIG. 1 is a drawing which shows an optical network provided with a wavelength division multiplexing optical switching system according to the present invention. The optical network includes four nodes 111 to 114, and an optical switching system 200 which supports communication between the nodes 111 to 114.

Figure 2:
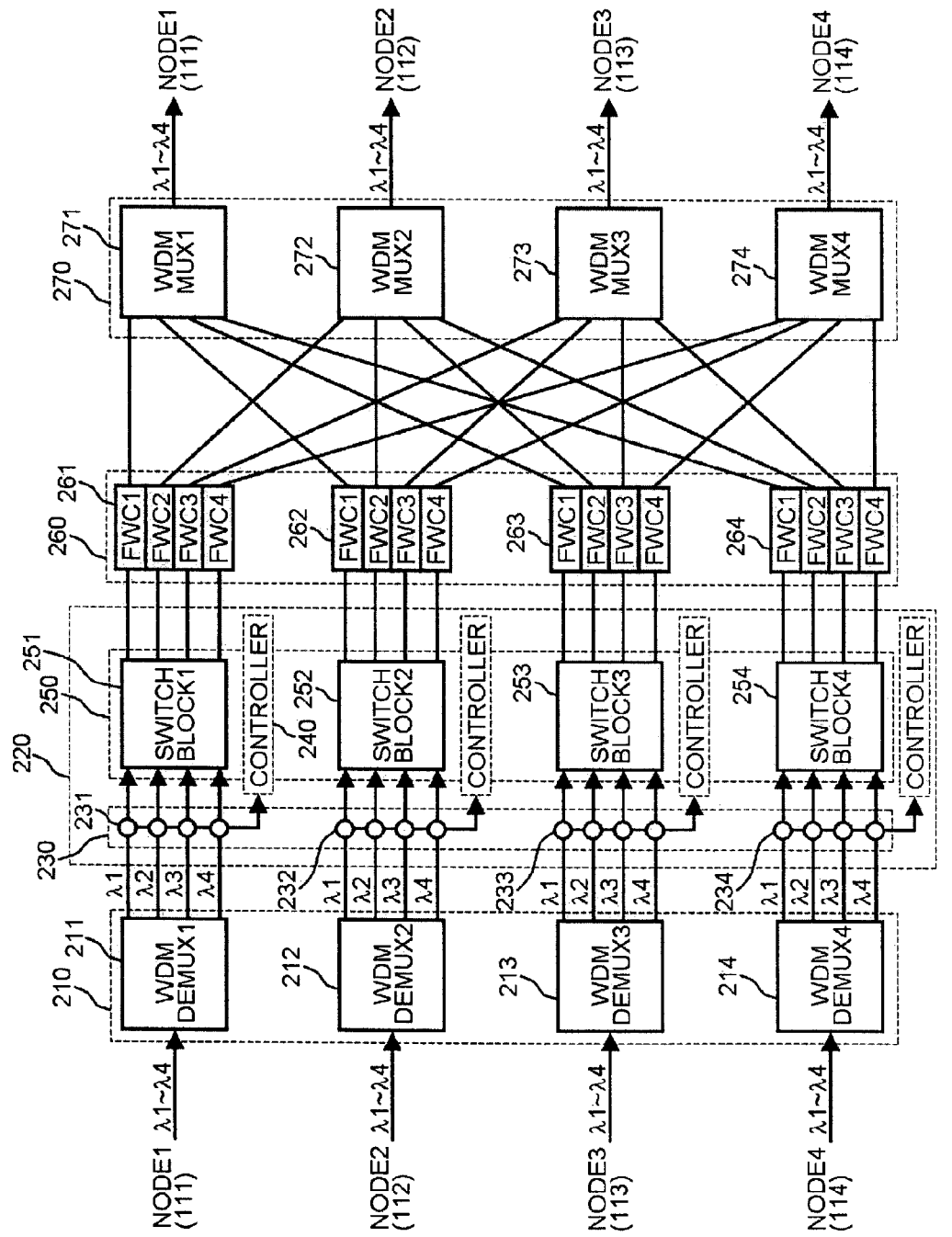
FIG. 2 is shows the entire construction of the optical switching system shown in FIG. 1.

FIG. 2 is a drawing which shows the optical switching system shown in FIG. 1. The optical signals transmitted onto the optical network consist of four channels λ1 to λ4, which have different wavelengths. The optical switching system includes a wavelength division demultiplexing unit 210, a routing unit 220, a fixed wavelength converting unit 260, and a wavelength division multiplexing unit 270.

The wavelength division demultiplexing unit 210 functions to demultiplex signals received from each of the nodes 111 to 114 and to output the signals as four channels λ1 to λ4. The wavelength division demultiplexing unit 210 comprises four wavelength demultiplexers 211 to 214, which are connected one-to-one with nodes 111 to 114. The wavelength division demultiplexers 211 to 214 each demultiplex optical signals, which are respectively input from the nodes 111 to 114 connected thereto, and outputs the four channels λ1 to λ4 which have different wavelengths. A 1×4 arrayed waveguide grating can be used for the wavelength division demultiplexers 211 to 214.

The routing unit 220 functions to classify the demultiplexed channels in accordance with the destinations thereof, and includes a branch unit 230, a switching unit 250 and a controller 240.

The branch unit 230 functions to partially branch each channel and to output the partially branched channels. The branch unit 230 includes four couplers 231 to 234. The four couplers 231 to 234 are connected one-to-one with the wavelength division demultiplexers 211 to 214. The couplers 231 to 234 each partially branch a channel input from the corresponding wavelength division demultiplexers 211 to 214 and outputs the branched channels to the controller 240.

The switching unit 250 functions to switch each channel to a route connected with a destination thereof in accordance with a control signal. The switching unit 250 includes four switch blocks 251 to 254. The switch blocks 251 to 254 are connected one-to-one with the four wavelength division demultiplexers 211 to 214. The switch blocks 251 to 254 each function to switch a route of each input channel in accordance with a control signal. For example, if an input channel is destined for the second node 112, a corresponding switch block switches the channel being output to a route connected with the second node 112.

The controller 240 determines a corresponding destination from each branched channel and outputs a control signal so that each channel can advance to its own destination. That is, the controller 240 reads address information and QoS (Quality of Service) information from a header of each inputted channel to control corresponding switch blocks 251 to 254.

Figure 3:
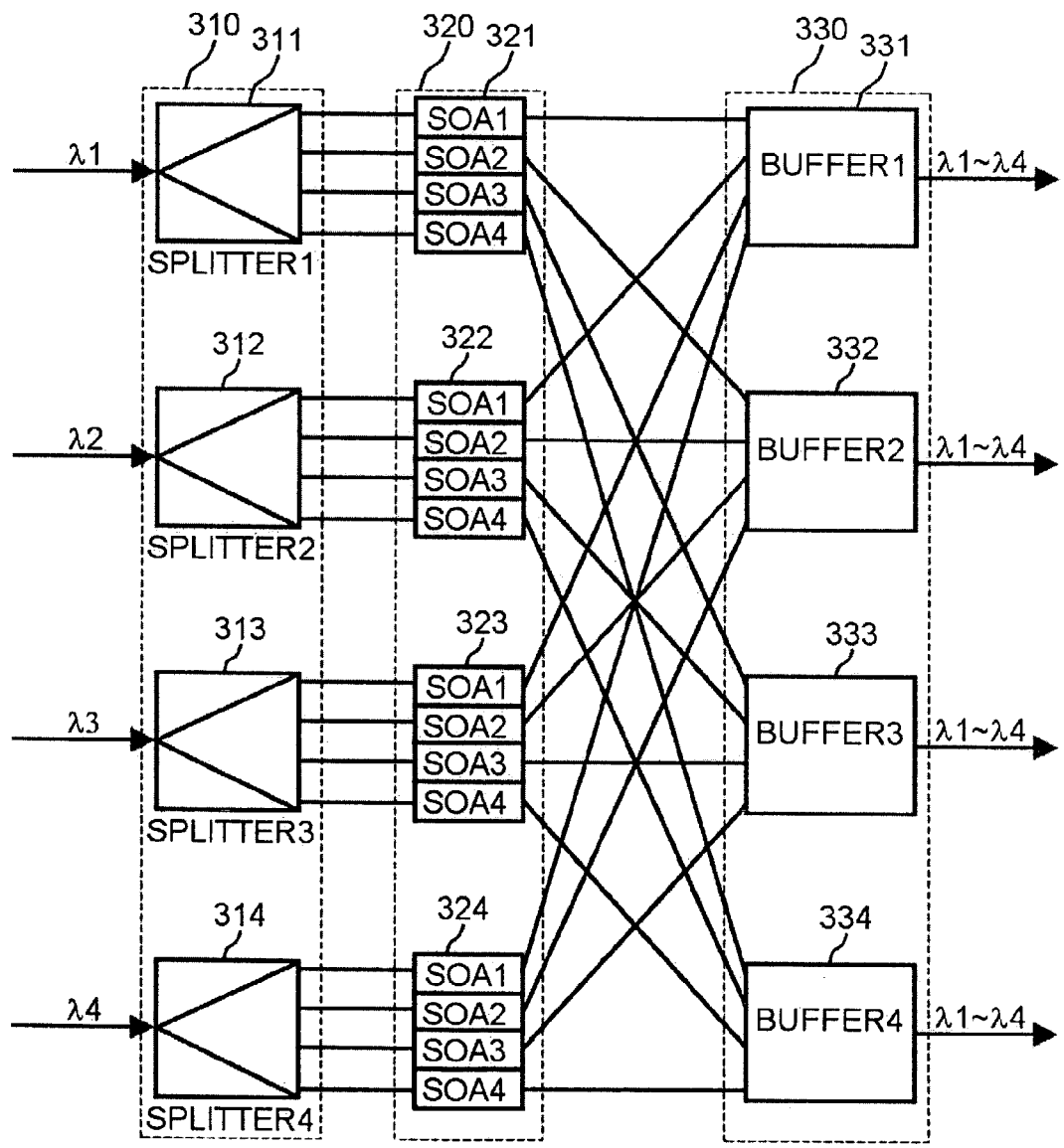
FIG. 3 shows the internal construction of one of the switch blocks shown in FIG. 1.

FIG. 3 shows the internal construction of one of the switch blocks 251 to 254 shown in FIG. 2. The switch blocks 251 to 254 each include a first splitting unit 310, a first selection unit 320 and a buffering unit 330.

The first splitting unit 310 functions to evenly split each input channel into four and then outputs the split channels, as shown. The first splitting unit 310 includes four splitters 311 to 314. The four splitters 311 to 314 are each input with channels of different wavelengths and the splitters 311 to 314 each evenly split an input channel into four and than outputs the split channels.

The first selection unit 320 functions to output one or more light beams, which advance to a corresponding destination among the multiple split light beams of each channel in accordance with a control signal. The first selection unit 320 includes four SOA gate arrays (semiconductor optical amplifier gate arrays) 321 to 324. The SOA gate arrays 321 to 324 are connected one-to-one with the splitters 311 to 314. The SOA gate arrays 321 to 324 each include four SOAs, SOA1 to SOA4, which are high speed switches for on/off switching. As a control signal is output to each of the SOA gate arrays 321 to 324, the controller 240 controls an input channel to be capable of being directed toward its own destination by switching on one SOA, among the four SOAs, SOA1 to SOA4, which constitute the corresponding one of the gate arrays 321 to 324.

The buffering unit 330 functions to arrange in order of time sequence the channels output from the first selection unit 320 and directed toward a same destination. The buffering unit 330 includes four buffers 331 to 334. The first buffer 331 is connected with the first SOA, SOA1, the second buffer 332 is connected with the second SOA, SOA2, the third buffer 333 is connected with the third SOA, SOA3, and the fourth buffer 334 is connected with the fourth SOA, SOA4. Each of the buffers 331 to 334 function to rearrange the output sequence of signals in order to prevent the signals from colliding with each other at the output end.

Figure 4:
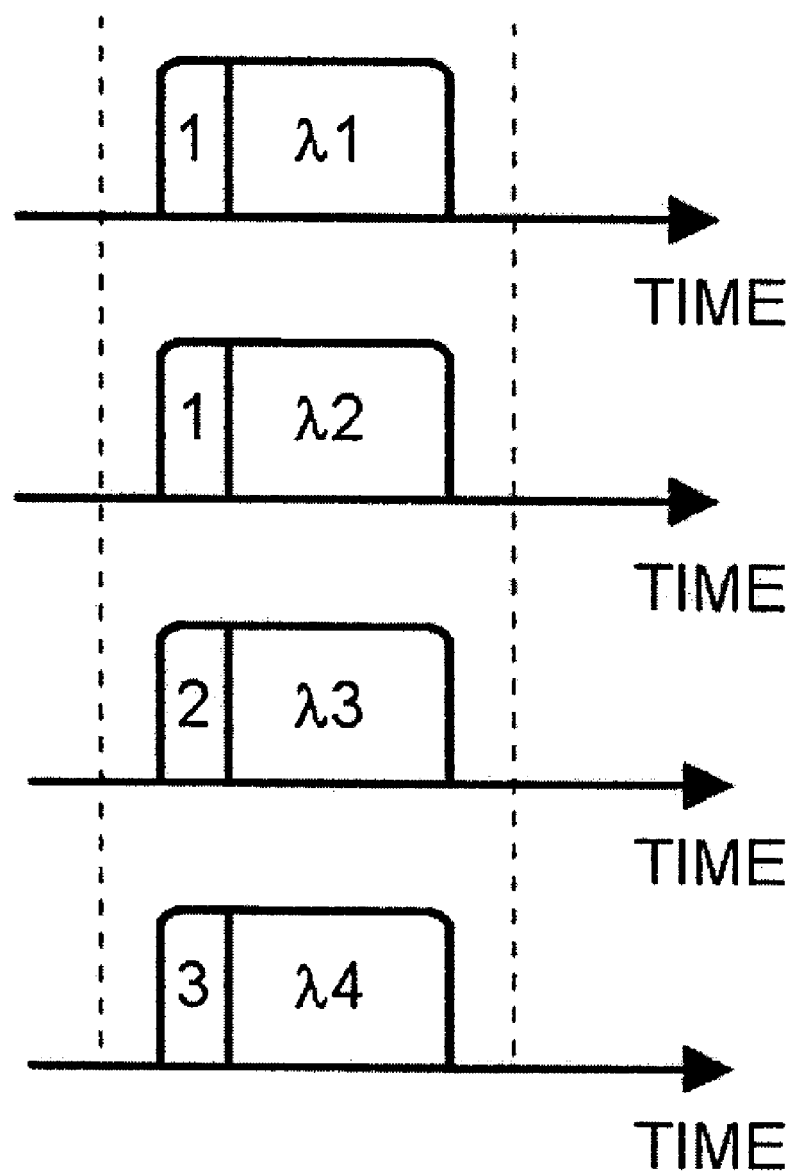
FIGS. 4 to 6 are drawings for illustrating the operation of the switch blocks shown in FIG. 3.
Figure 5:
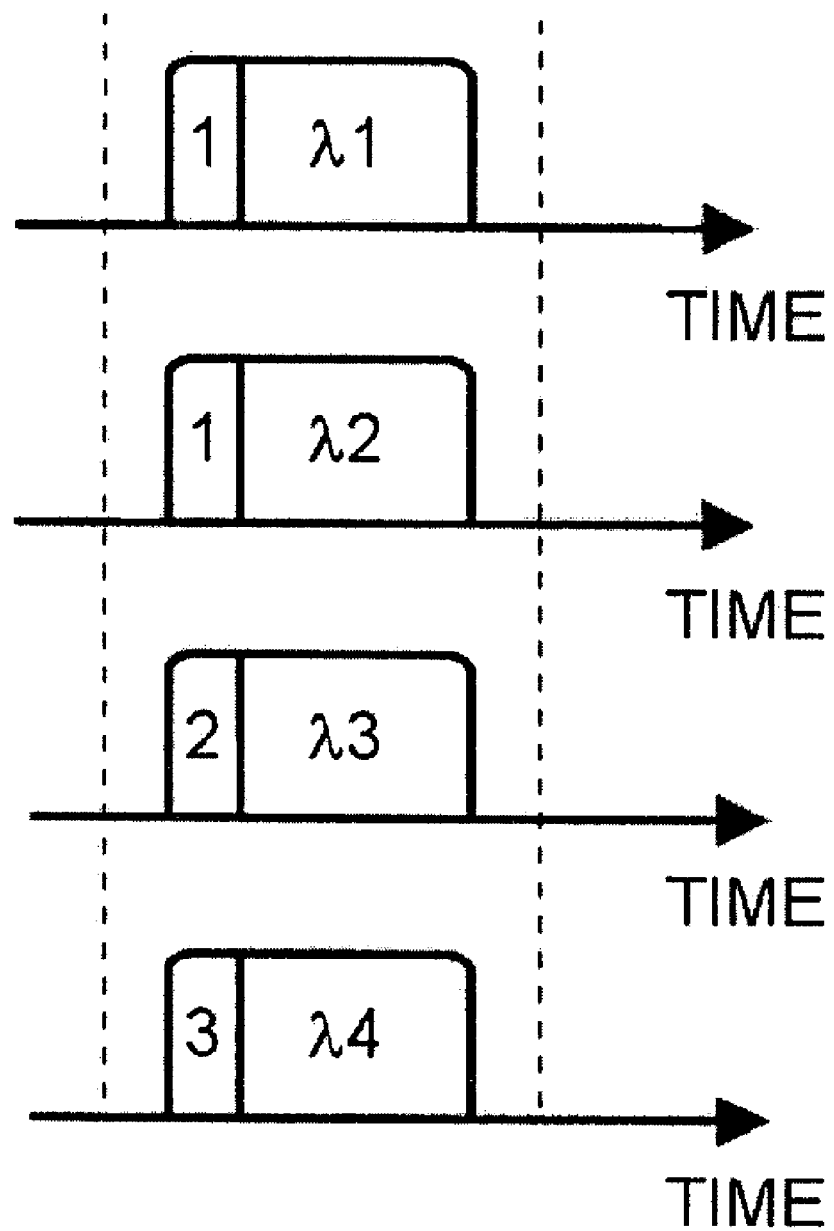
Figure 6:
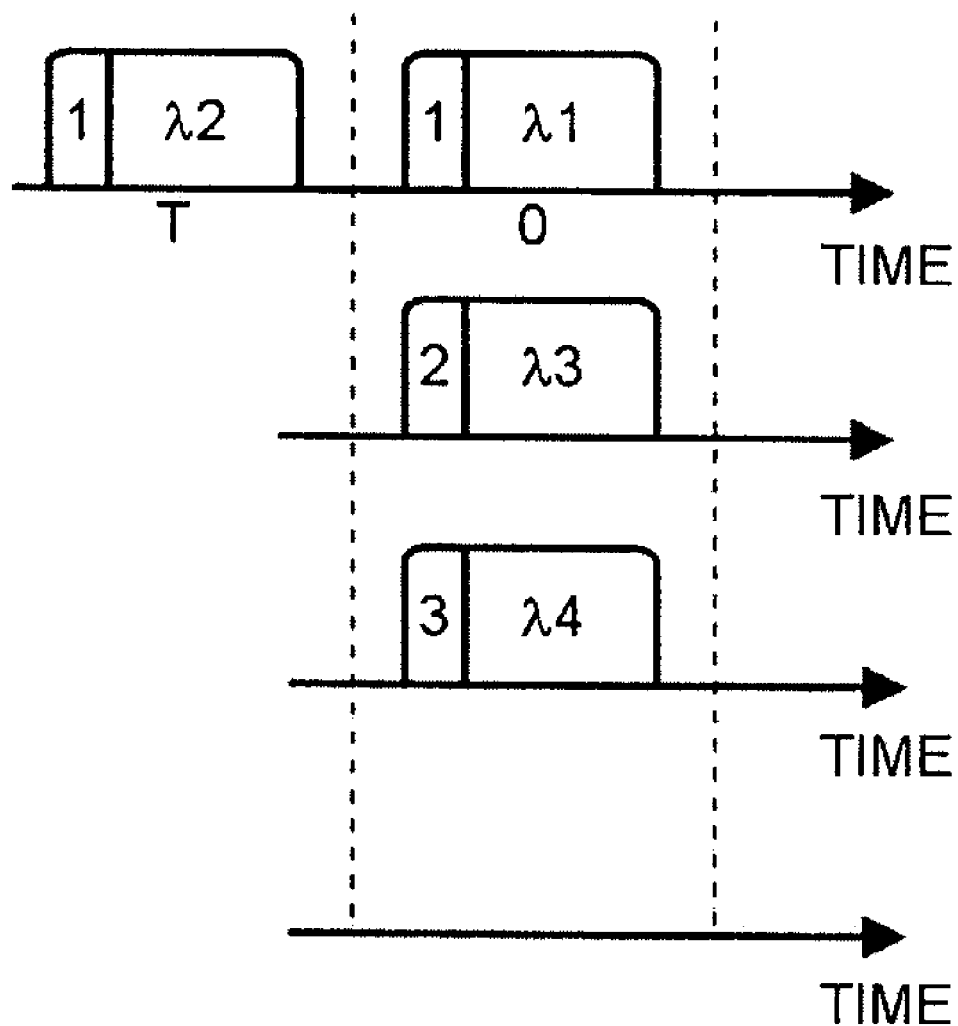

FIGS. 4 to 6 are drawings for illustrating the operation of the switch blocks 251 to 254 shown in FIG. 3. FIG. 4 shows four channels being input into the first splitting unit 310. FIG. 5 shows four channels being input into the buffering unit 330. FIG. 6 shows four channels being output from the buffering unit 330. The four channels λ1 to λ4 are input into the switch blocks 251 to 254, in which the first and second channels λ2 and λ2 are destined for the first node 111, the third channel λ3 is destined for the second node 112, and the fourth channel λ4 is destined for the third node 113. The controller 240 reads the address information of each channel. The controller 240 then switches on SOA1 of the first SOA gate array 321 in order to output the first channel λ1 to the first channel 331, switches on SOA1 of the second SOA gate array 322 in order to output the second channel λ2 to the first buffer 331, switches on SOA2 of the third SOA gate array 323 in order to output the third channel λ3 into the second buffer 332, and switches on SOA3 of the fourth SOA gate array 324 in order to output the fourth channel λ4 to the third buffer 333.

Figure 7:
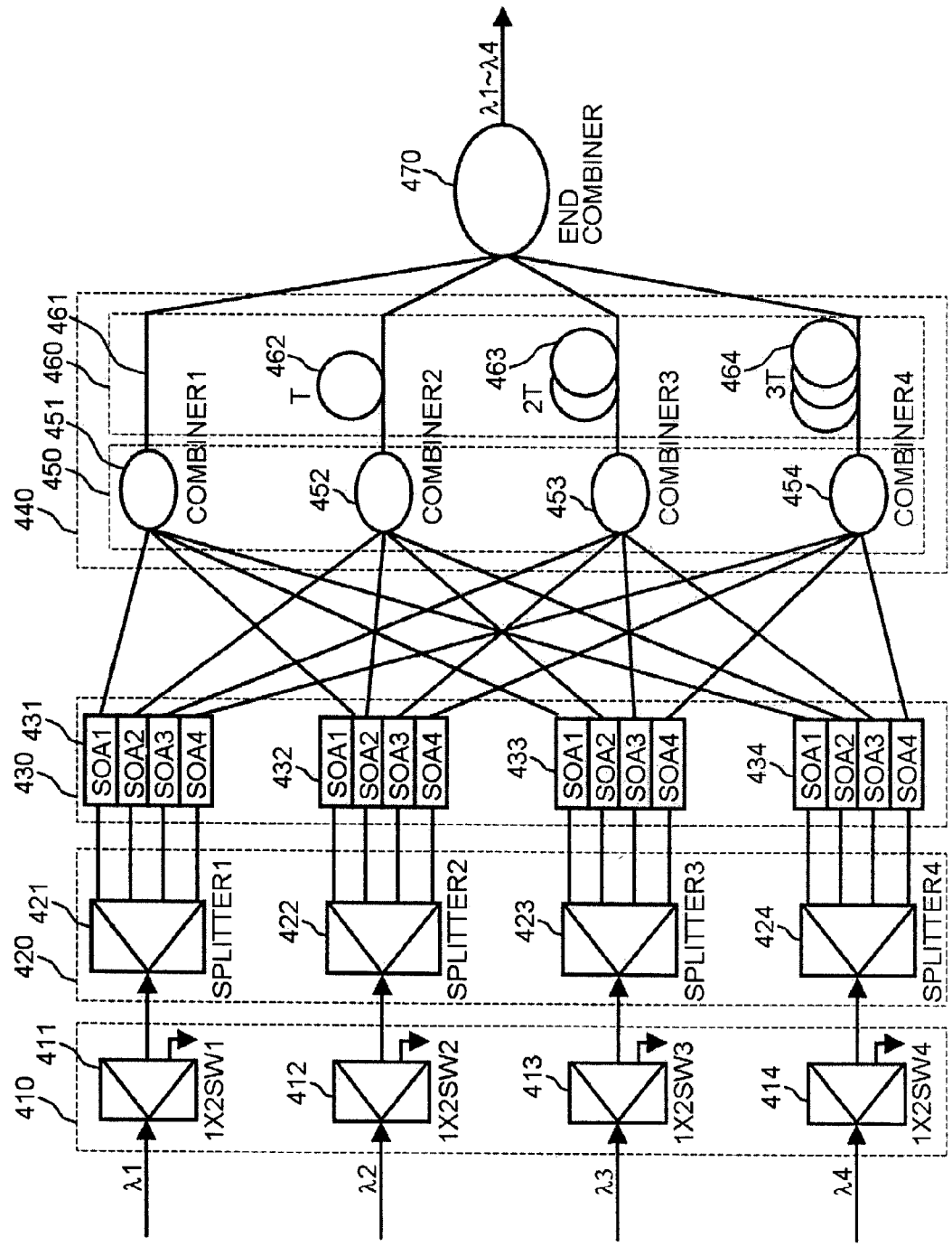
FIG. 7 shows the international construction of one of the buffers shown in FIG. 3.
Figure 8:
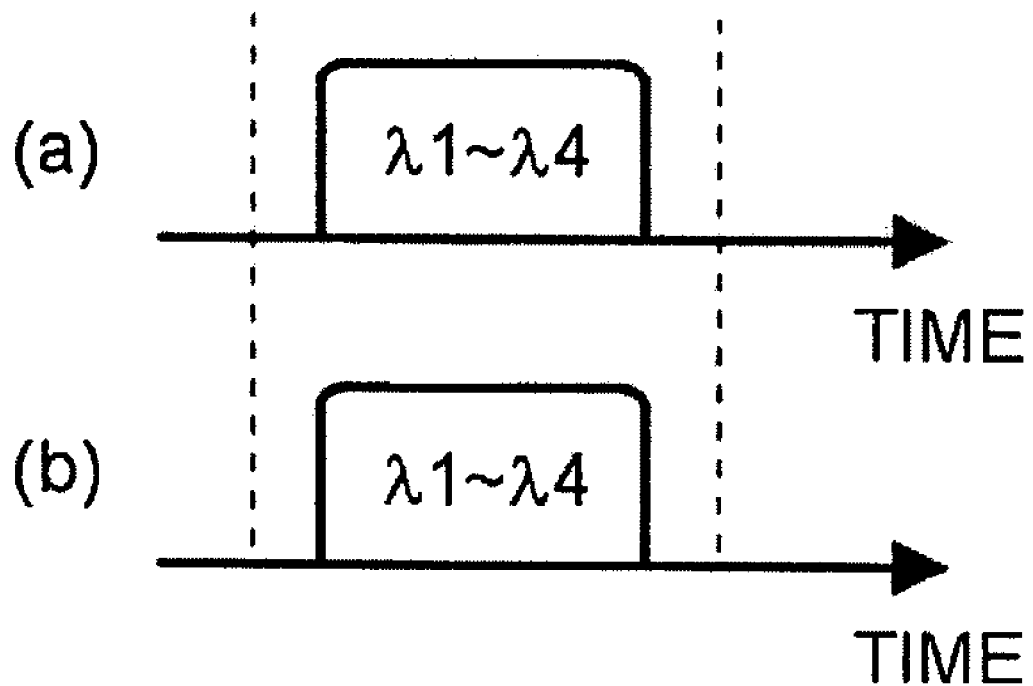
FIGS. 8 to 15 are drawings for illustrating the optical switching system shown in FIG. 2.

FIG. 7 shows the internal construction of one of the buffers 331 to 334 shown in FIG. 3. Each of the buffers 331 to 334 includes an auxiliary switching unit 410, a second splitting unit 420, a second selection unit 430, a first delay unit 440 and a second combiner unit 470.

The auxiliary switching unit 410 functions to help the expansion of the buffers 331 to 334, as described below. The auxilary switching unit 410 includes four switches 411 to 414. The switches 411 to 414 are input with four channels which have different wavelengths. Each of the switches 411 to 414 pass an input channel as is. The switches 411 to 414 can be formed from a 1×2 switch which has one input end and two output ends.

The second splitting unit 420 functions to evenly split the channels each directed toward a same destination and to output the split channels. The second splitting unit 420 includes four splitters 421 to 424. The splitters 421 to 424 are connected one-to-one with the switches 411 to 414 and each are input with channels of different wavelengths. Each of the splitters 421 to 424 evenly splits an input channel and then outputs the split channels.

The second selection unit 430 functions to output one or more light beams, which have an allocated delay time among the split light beams of each channel in accordance with a control signal. The second selction unit includes four SOA gate arrays 431 to 434. The SOA gate arrays 431 to 434 are connected one-to-one with the splitters 421 to 424. Each of the SOA gate arrays 431 to 434 include four SOAs, SOA1 to SOA4, which are high speed switches for on/off switching. As a control signal is output to each of the SOA gate arrays 431 to 434, the controller 240 controls each input channel to be delayed by an allocated time by switching on one SOA, among the four SOAs, SOA1 to SOA4, which constitute corresponding one of the gate arrays 431 to 434. The control unit 240 outputs control signals so that the channels directed toward a same destination are serially spread to have a time interval of at least T (>0), thereby not becoming overlapped.

The first delay unit 440 functions to delay each channel output from the second selection unit 430 by an allocated time and to output the delayed channels. The first delay unit includes a first combiner unit 460 and a first delay routing unit 460. The first combiner unit 450 includes four combiners 451 to 454 and functions to collect and output channels of different wavelengths from the SOA gate arrays 431 to 434. The first combiner 451 is connected with the first SOA, SOA1, the second combiner 452 is connected with the second SOA, SOA2, the third combiner 453 is connected with the third SOA, SOA3, and the fourth combiner 454 is connected with the fourth SOA, SOA4. The delay routing unit 460 includes first to fourth delay lines 461 to 464, and functions to delay an inputted channel by an allocated time and to output the delayed channels. The first delay line 461, which has a delay time of zero, is connected with the first combiner 451. The second delay line, which has a delay time of T, is connected with the second combiner 452. The third delay line 463, which has a delay time of 2T, is connected with the third combiner 453. The fourth delay line 464, which has a delay time of 3T, is connected with the fourth combiner 454.

The second combiner unit 470 collects and outputs first to four channels λ1 to λ4 which have passed the first to fourth delay lines 461 to 464, respectively.

Figure 16:
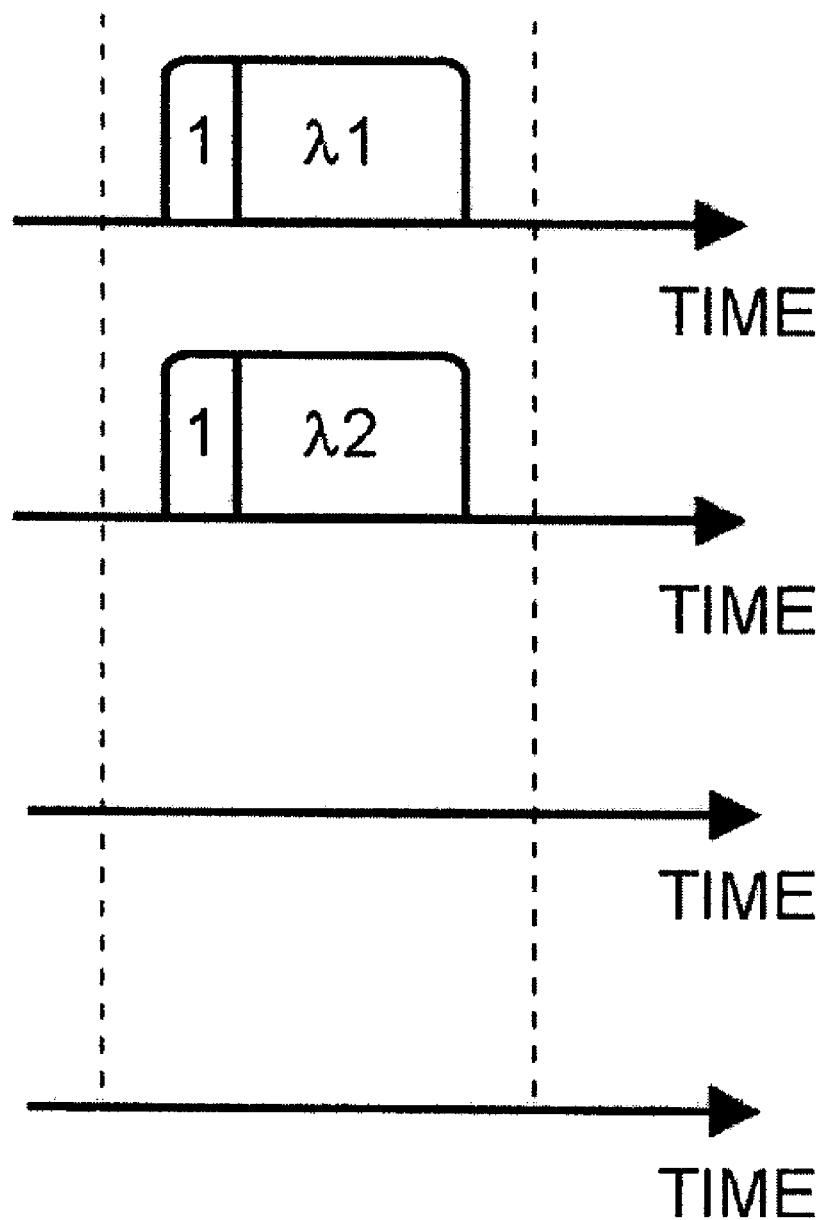
FIGS. 16 and 17 are drawings for illustrating the operation of the buffers shown in FIG. 7.
Figure 17:
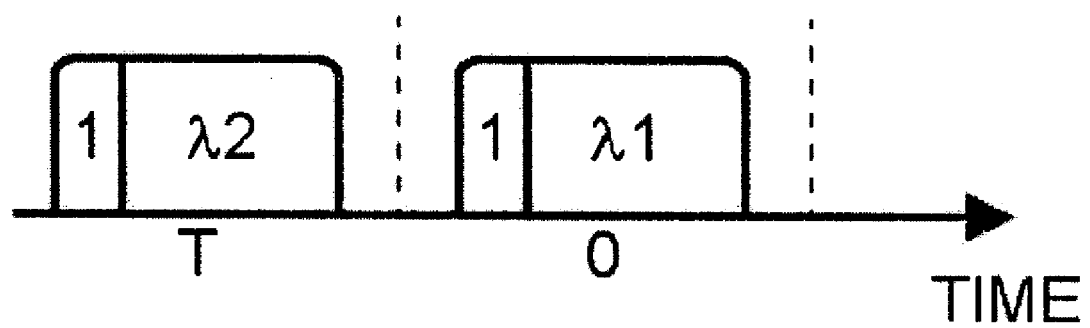

FIGS. 16 and 17 are drawings illustrating the operation of the buffers 331 to 334 shown in FIG. 7. Referring to FIG. 16, the first and second channels λ1 and λ2, which are destined for the first node 111, are input to the buffers. The controller 240 switches on SOA1 of the first SOA gate array 431, so that the first channel λ1 passes the first delay line 461 with a delay time of zero, and switches on SOA2 of the second SOA gate array 432 to render the second channel λ2 to pass the second delay line 462. FIG. 17 shows the first and second channels λ1 and λ2 output from the buffers 331 to 334.

Referring to FIG. 2 again, the fixed wavelength converting unit 260 converts different wavelengths of the channels classified by the routing unit 220 into corresponding wavelengths according to the starting place thereof. The fixed wavelength converting unit 260 comprises four fixed wavelength converter (FWC) arrays 261 to 264. The FWC arrays 261 to 264 are connected one-to-one with the switch blocks 251 to 254. That is, the first FWC array 261 converts the four channels with the different wavelngths input from the first switch block 251 into the first channels with the same wavelength, the second FWC array 262 converts the four channels with the different wavelngths input from the second switch block 252 into the second channels with the same wavelength, the third FWC array 263 converts the four channels with the different wavelngths input from the third switch block 253 into the third channels with the same wavelength, and the fourth FWC array 264 converts the four channels with the different wavelngths input from the fourth switch block 254 into the fourth channels with the same wavelength.

As described above, upon passing through the fixed wavelength converting unit 260, the four channels λ1 to λ4 input from the first node 111 are converted into the first channels and directed toward corresponding destinations whatever addresses of destinations they have. The four channels λ1 to λ4 input from the second node 112 are converted into the second channels and directed toward corresponding destinations. Considering one destination, because the channels, which are outputted from peripheral starting places, are converted to have different wavelengths and then input into the destination, will not come into collision with each other. Therefore, no separate fiber optic delay line is needed. In addition, it is possible to make a desired connection to any place while avoiding instability and time delay of a wavelength variable converter because the problem of collision can be solved without using such a variable wavelength converter, which can variably change the wavelengths of channels.

For example, even in the worst case where all of the optical signals of the four channels input from the first node 111 are destined for the first node 111, the controller 240 switches on SOA1 of the first switch block 251 to be suitable for a destination. Each channel is split again into four by splitters 421 to 424 of the first buffer 331. Then each channel is passed through the four delay lines 461 to 464 with a time delay of 0 to 3T, so the channels λ1 to λ4 in the overlapped time zone are rearranged. Then, the four channels λ1 to λ4 are arranged in order with a constant time interval T, and then converted into the first channels λ1 after passing through the first FWC array 261 and then output into the first node 111, which is the destination thereof. In this case, even if one or more channels input from any other node are destined for the first node 111, they experience the same procedure and are input into the first node 111 prior to a corresponding FWC array. Then they are output after being converted into a channel different from the first channel λ1 which is directed toward the first node. Therefore, their wavelengths do not overlapped in the destination and thus no collision will occur.

The wavelength division multiplexing unit 270 functions to classify and collect the channels wavelength-converted in the fixed wavelength converting unit 260 in accordance with the destinations thereof and then output these channels as multiplexed optical signals. The wavelength division multiplexing unit 270 includes four wavelength division multiplexers 271 to 274. The wavelength division multiplexers 271 to 274 are connected one-to-one with the nodes 111 to 114. The first wavelength division multiplexer 271 is connected with FWC1 of the four FWC arrays 261 to 264, the second wavelength division multiplexer 272 is connected with FWC2, the third wavelength division multiplexer 273 is connected with FWC3, and the fourth wavelength division multiplexer 274 is connected with FWC4.

FIGS. 8 to 15 are drawings for illustrating the operation of the optical switching system shown in FIG. 2. FIG. 8a shows an optical signal being input from the first node 111 and FIG. 8b shows an optical signal being input from the second node 112.

Figure 9:
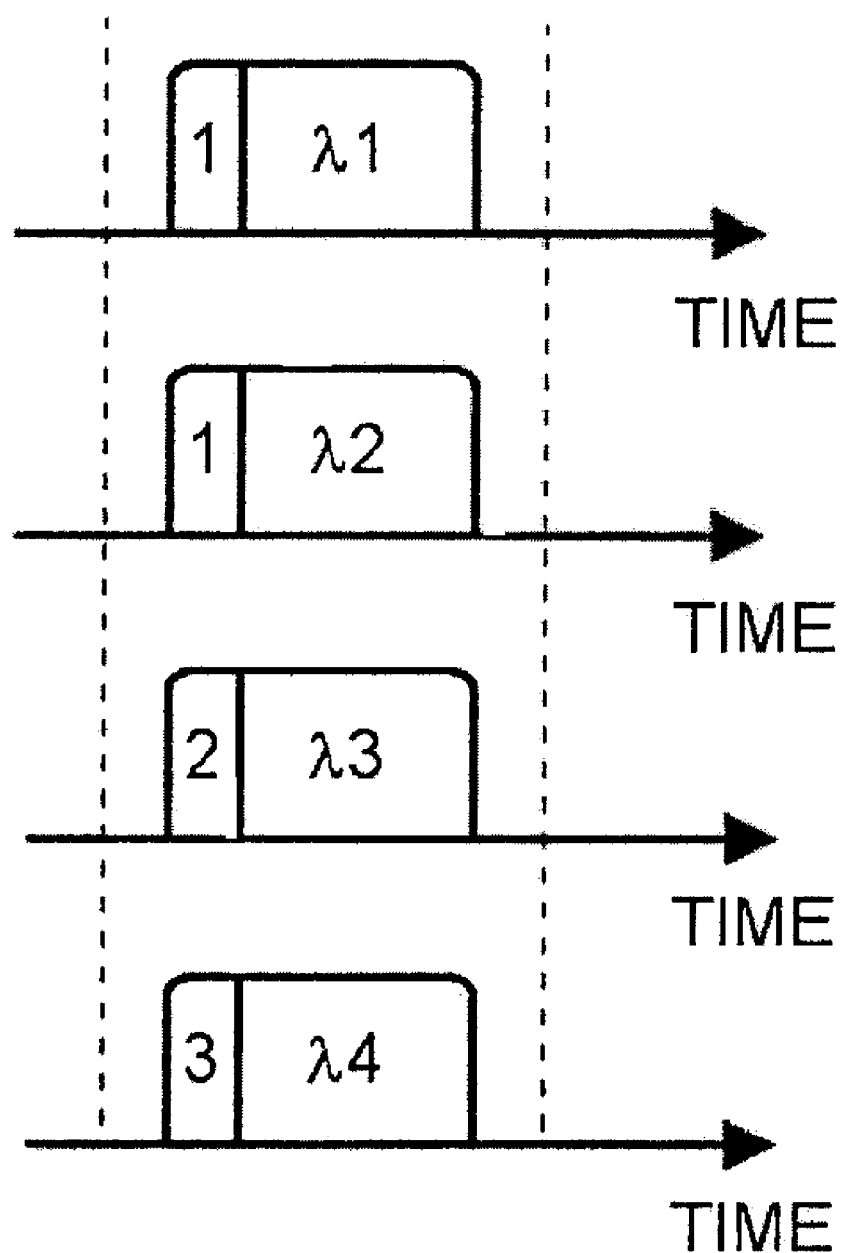

FIG. 9 shows four channels λ1 to λ4 being input into the first switch block 251, in which the first channel λ1 and the second channel λ2 are destined for the first node 111, the third channel λ3 is destined for the second node 112, and the fourth channel λ4 is destined for the third node 113.

Figure 10:
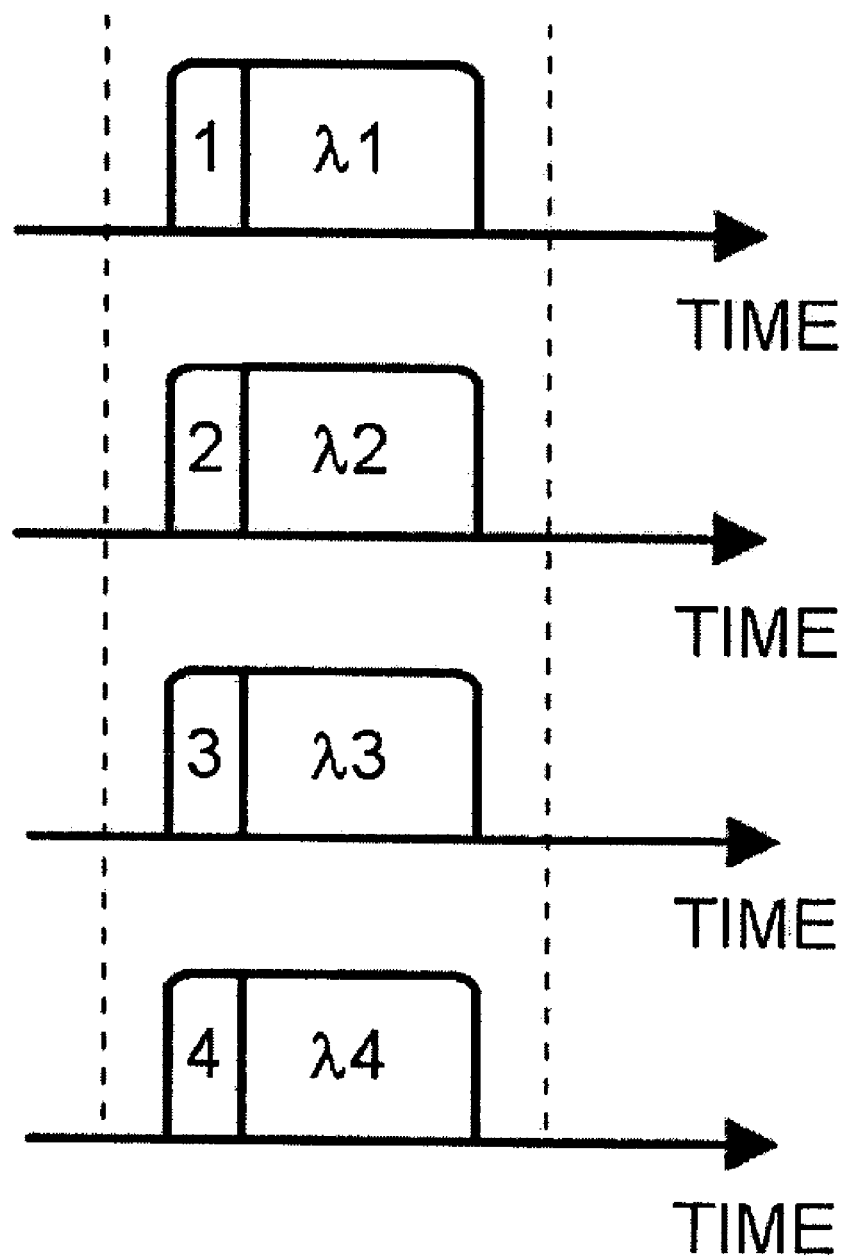
Figure 11:
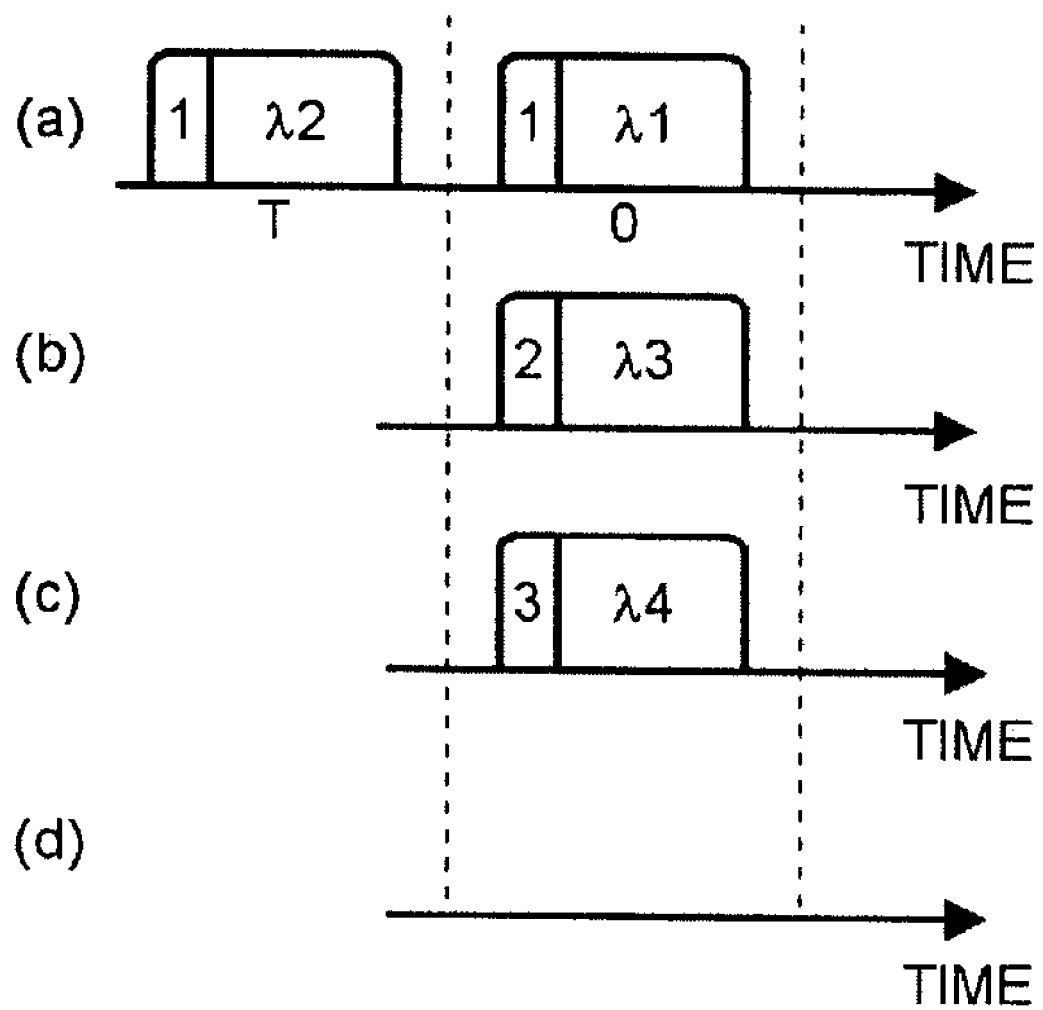
Figure 12:
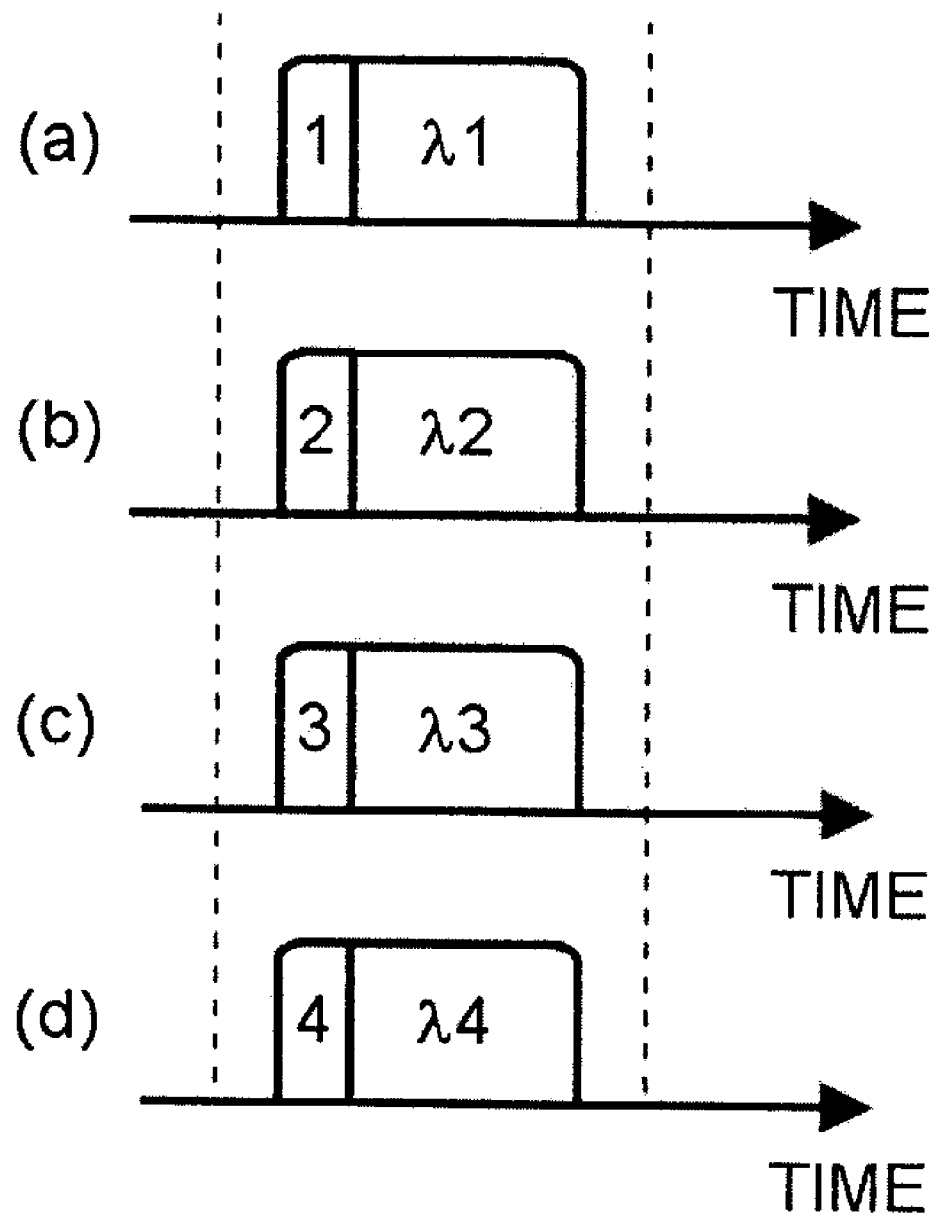
Figure 13:
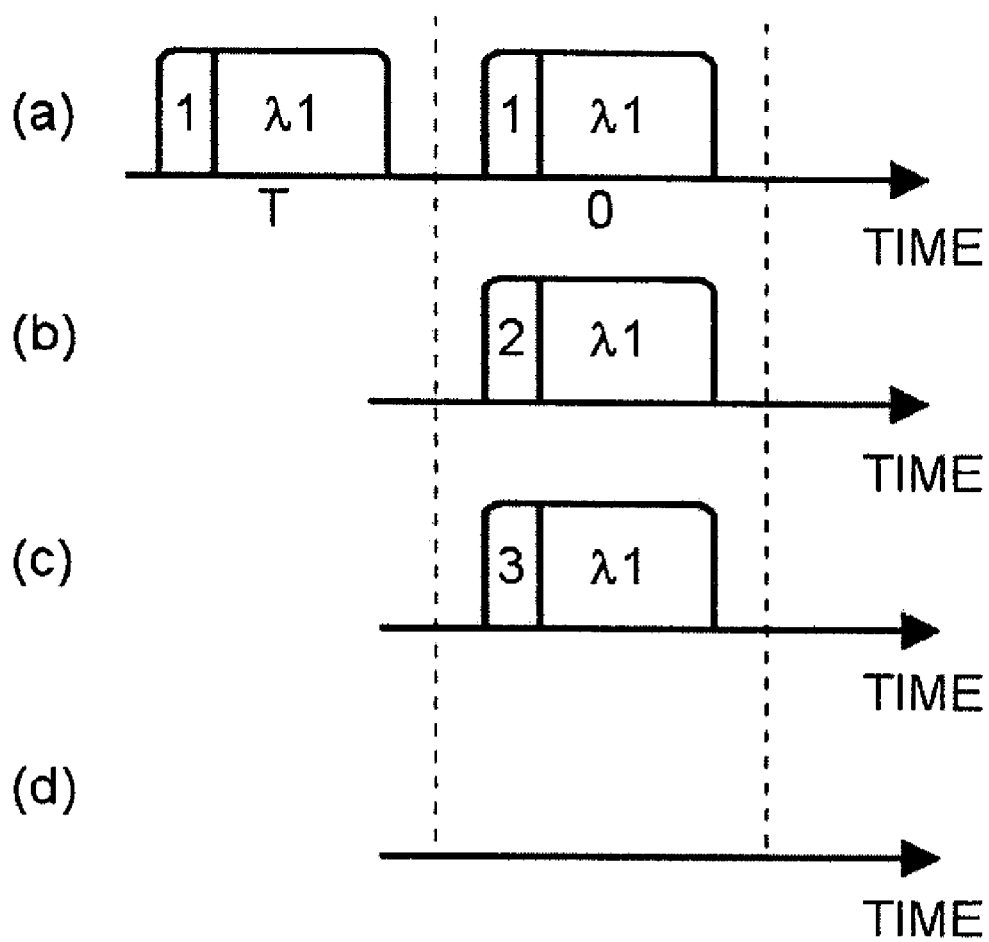
Figure 14:
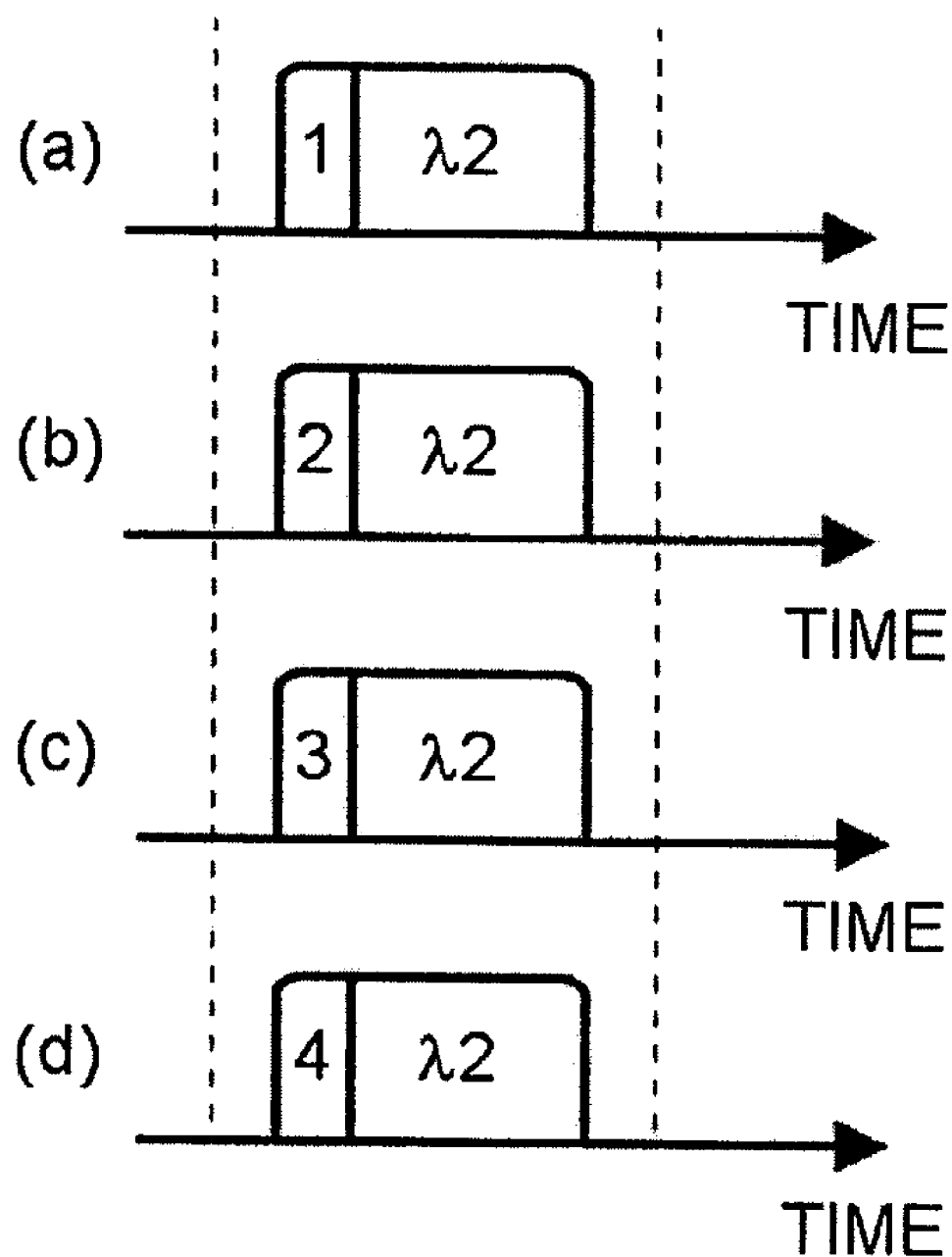
Figure 15:
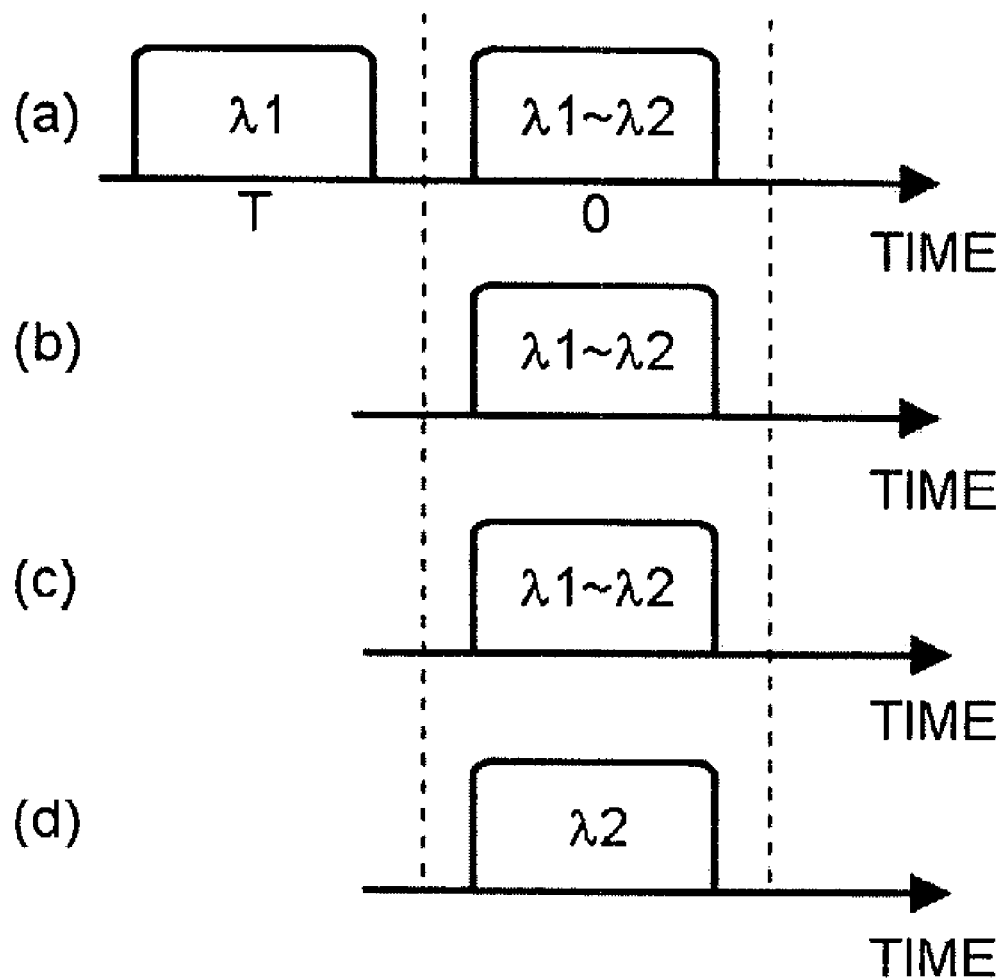

FIG. 10 shows four channels λ1 to λ4 being input into the second switch block 252, in which the first channel λ1 is destined for the first node 111, the second channel λ2 is destined for the second node 112, the third channel λ3 is destined for the third node 113, and the fourth channel λ4 is destined for the fourth node 114.

FIG. 11a shows the first and second channels λ1 and λ2 being input into FWC1 of the first FWC array 261. FIG. 11b shows the third channel λ3 being input into FWC2 of the first FWC array 261. FIG. 11c shows the fourth channel λ4 being input into FWC3 of the first FWC array 261. FIG. 11d shows that there is no channel being input into FWC4 of the first FWC array 261. As can be seen from the drawings, the first and second channels λ1 and λ2, which are destined for the first node 111, is input into the first FWC1, the third channel λ3, which is destined for the second node, 112 is input into the second FWC, FWC2, and the fourth channel λ4, which is destined for the third node 113, is input into the third FWC, FWC3.

FIG. 12a shows the first channel λ1 being input into FWC 1 of the second FWC array 262. FIG. 12b shows the second channel λ2 being input into FWC2 of the second FWC array 262. FIG. 12c shows the third channel λ3 being input into FWC3 of the second FWC array 262. FIG. 12d shows the fourth channel λ4 being input into the FWC4 of the second FWC array 262. As can be seen from the drawings, the first channel λ1, which is destined for the first node 111, is input into the first FWC, FWC1, the second λ2, which is destined for the second node 111, is input into the second FWC, FWC2, the third channel λ3, which is destined for the third node 113, is input into the third FWC, FWC3, and the fourth channel λ4, which is destined for the fourth node 114, is input into the fourth FWC, FWC4.

FIG. 13a shows the first channels λ1 being output from FWC1 of the first FWC array 261. FIG. 13b shows the first channel λ1 being output from FWC2 of the first FWC array 261. FIG. 13c shows the first channel λ1 being output from FWC3 of the first FWC array 261. FIG. 13d shows that there is no channel being output from FWC4 of the first FWC array 261. As can be seen from the drawings, the four channels λ1 to λ2, which are input into the first FWC array 261 are output after being wavelength-converted into the first channels 1.

FIG. 14a shows the second channel λ2 being output from FWC1 of the second FWC array 262. FIG. 14b shows the second channel λ2 being output from the second FWC2 of the first FWC array 262. FIG. 14c shows the second channel λ2 being output from FWC3 of the second FWC array 262. FIG. 14d shows the channel λ2 being output from FWC4 of the second FWC array 262. As can be seen from the drawings, the four channels λ1 to λ2, which are input into the second FWC array 262 are output after being wavelength-converted into the second channels λ2.

FIG. 15a shows an optical signal being output from the first wavelength division multiplexer 271. FIG. 15b shows an optical signal being output from the second wavelength division multiplexer 272. FIG. 15c shows an optical signal being output from the third wavelength multiplexer 273. FIG. 15d shows an optical signal being output from the fourth wavelength division multiplexer 274. As can be seen from the drawings, the four multiplexers 271 to 274 wavelength-divide, multiplex and then output one or more channels input.

Hitherto, description has been made to the case in which both of the numbers of nodes and the number of wavelengths are identically fixed to four. Wavelength expandability and link expandability are important factors to be considered at the time of design. Because wavelength expandability and link expandability allow a network construction to be maintained merely by adding some components without changing the existing connecting relationship, even if the demands for network are increased, the number of wavelengths or the number of the links is required to be increased due to newly added nodes while the network is being operated.

Figure 18:
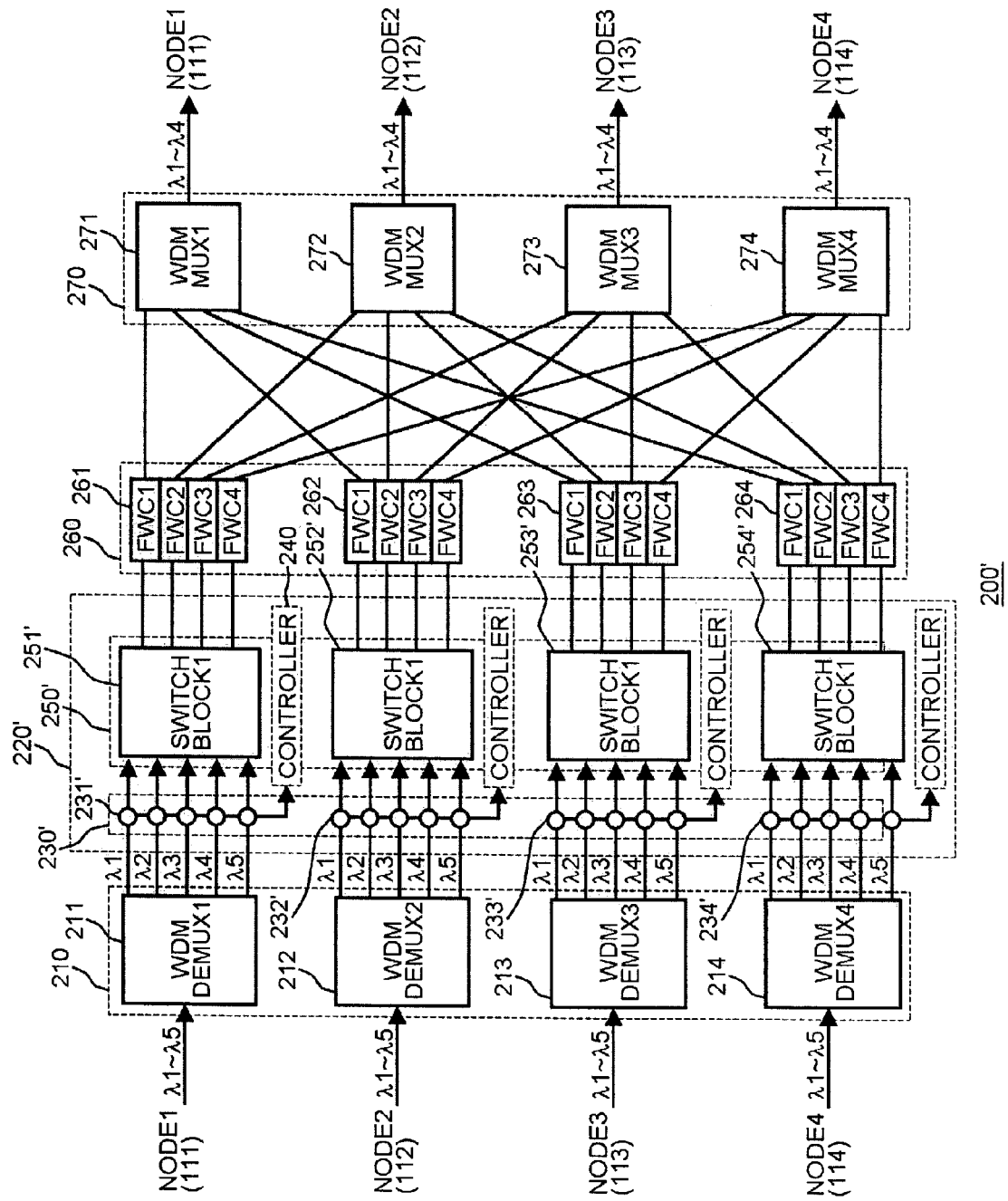
FIGS. 18 to 20 are drawings for illustrating the wavelength expandability of the optical switching system shown in FIG. 2.
Figure 19:
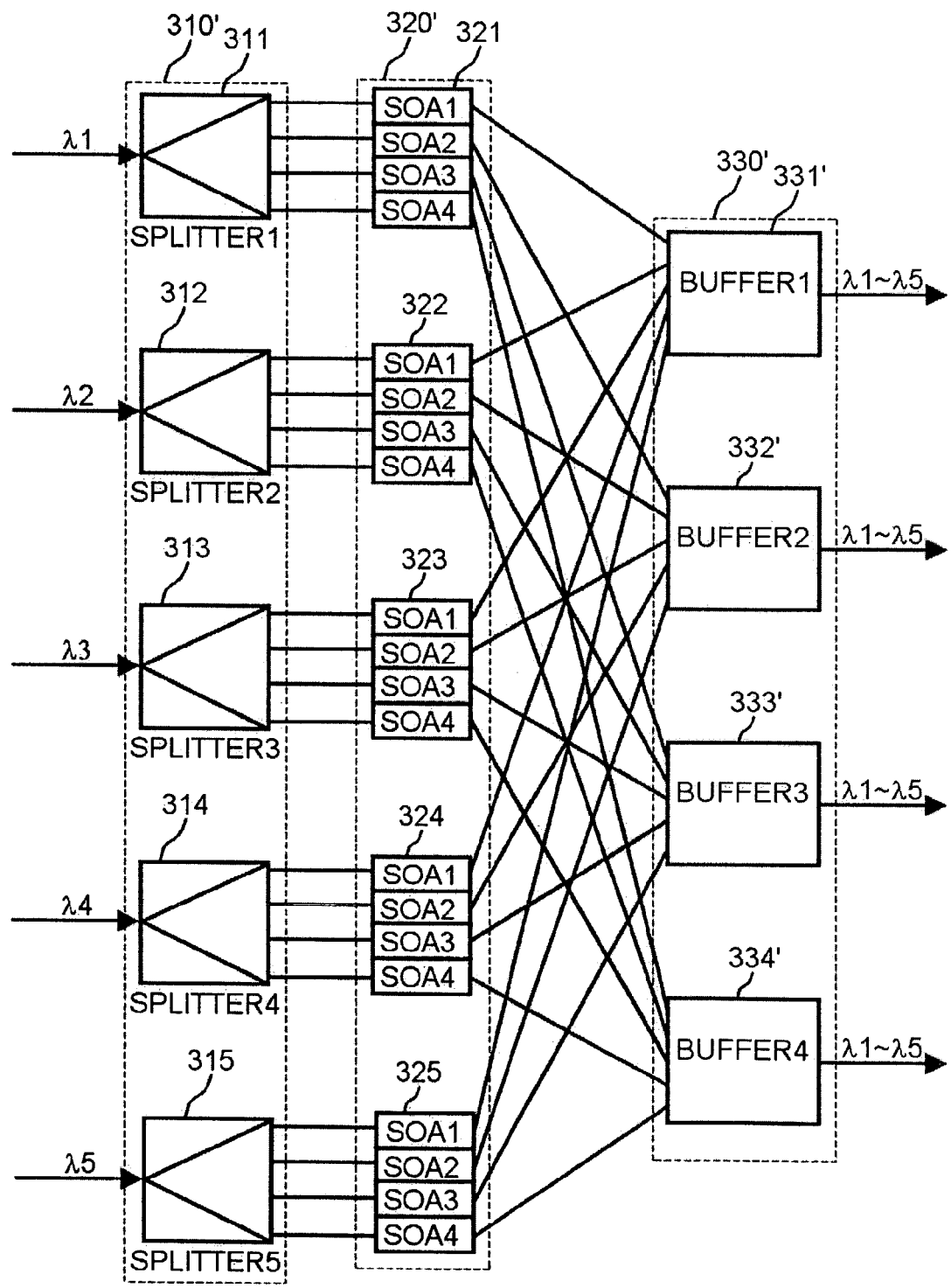
Figure 20:
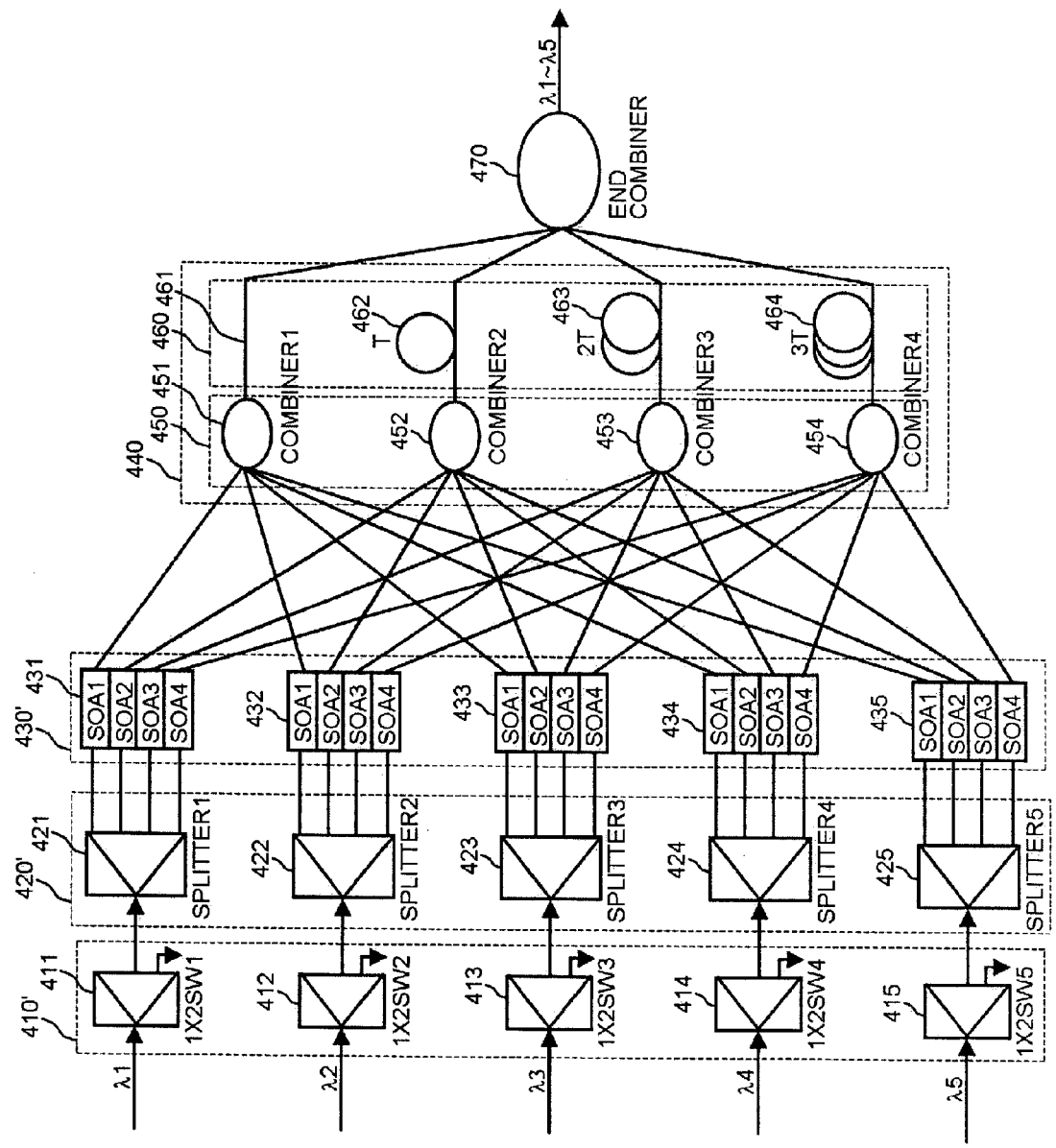

FIGS. 18 to 20 are drawings for illustrating the wavelength expandability of the optical switching system shown in FIG. 2. The optical switching system 200' shown in FIGS. 18 to 20 is constructed by additionally providing the optical switching system 200 shown in FIG. 2 with some constituent components for expansion of wavelengths. Therefore, hereinafter, overlapped description will be omitted and the same reference numerals will be used for the same constituent components.

Referring to FIG. 18, each of wavelength division demultiplexers 211 to 214 demultiplex optical signals of five channels input from nodes connected thereto. Therefore, each of the wavelength division demultiplexers 211 to 214 output five channels λ1 to λ5, which have different wavelengths.

Referring to FIG. 19, each of the switch blocks 251' to 254' further comprises a fifth splitter 315 and a fifth SOA gate array 325 in order to process the fifth channel λ5. The fifth channel λ5 is input into the fifth splitter 315 and the fifth splitter 315 evenly splits the fifth channel λ5 into four and outputs the split channels. The fifth SOA gate array 325 is connected with the fifth splitter 315. The fifth SOA gate array 325 includes four SOAs, SOA1 to SOA4. The controller 240 outputs a control signal to the fifth SOA gate array 325, so that one of the SOAs is switched on, thereby controlling the fifth channel λ5 to be directed toward its own destination.

Referring to FIG. 20, each of the buffers 331' to 334' further comprises a fifth switch 415, a fifth splitter 425, a fifth SOA gate array 435 in order to process the fifth channel λ5. The fifth switch 415 passes the input fifth channel λ5 as is. The fifth splitter 425 is connected with the fifth switch 415. The fifth splitter 425 evenly splits the fifth channel λ5 into four and outputs the split channels. The fifth SOA gate array 435 comprises four SOAs, SOA1 to SOA 4. The controller 240 outputs control signals to the fifth SOA gate array 435, so that the one SOA is switched on among the four SOAs, SOA1 to SOA4. This enables an input channel to pass through one of the four delay lines 461 to 464 having a delay time of 0 to 3 T, respectively. The controller 240 outputs a control signal so that the channels directed toward a same destination are serially spread to have a time interval of at least T(>0), thereby not being overlapped.

It may be appreciated that an effective routing can be executed without needing to rearrange the connections between nodes as described above. That is, the connecting relationship between nodes is constantly maintained in the optical switching systems 200, 200' shown in FIGS. 2 and 18.

Figure 21:
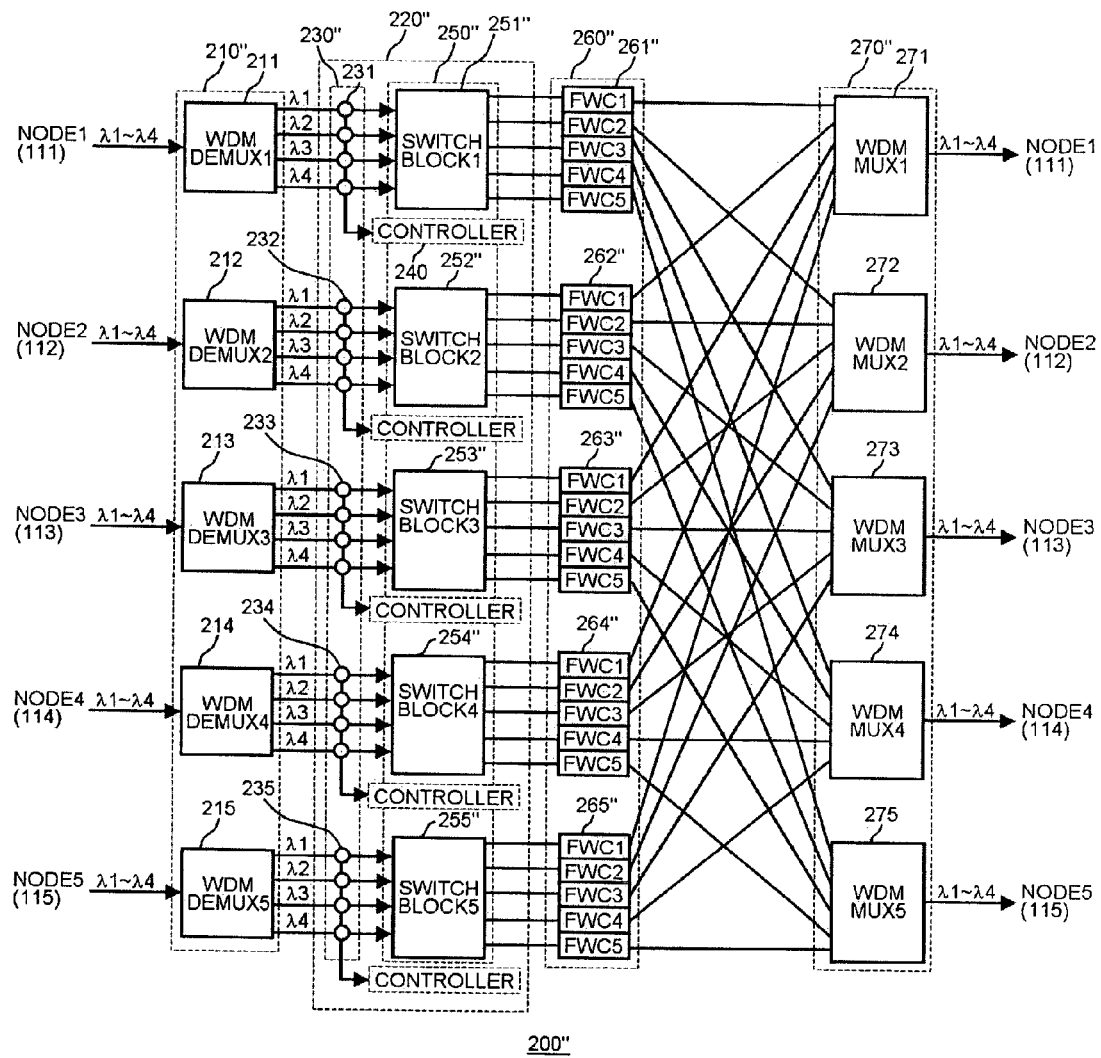
FIGS. 21 to 23 are drawings for illustrating the link expandability of the optical switching system shown in FIG. 2.
Figure 22:
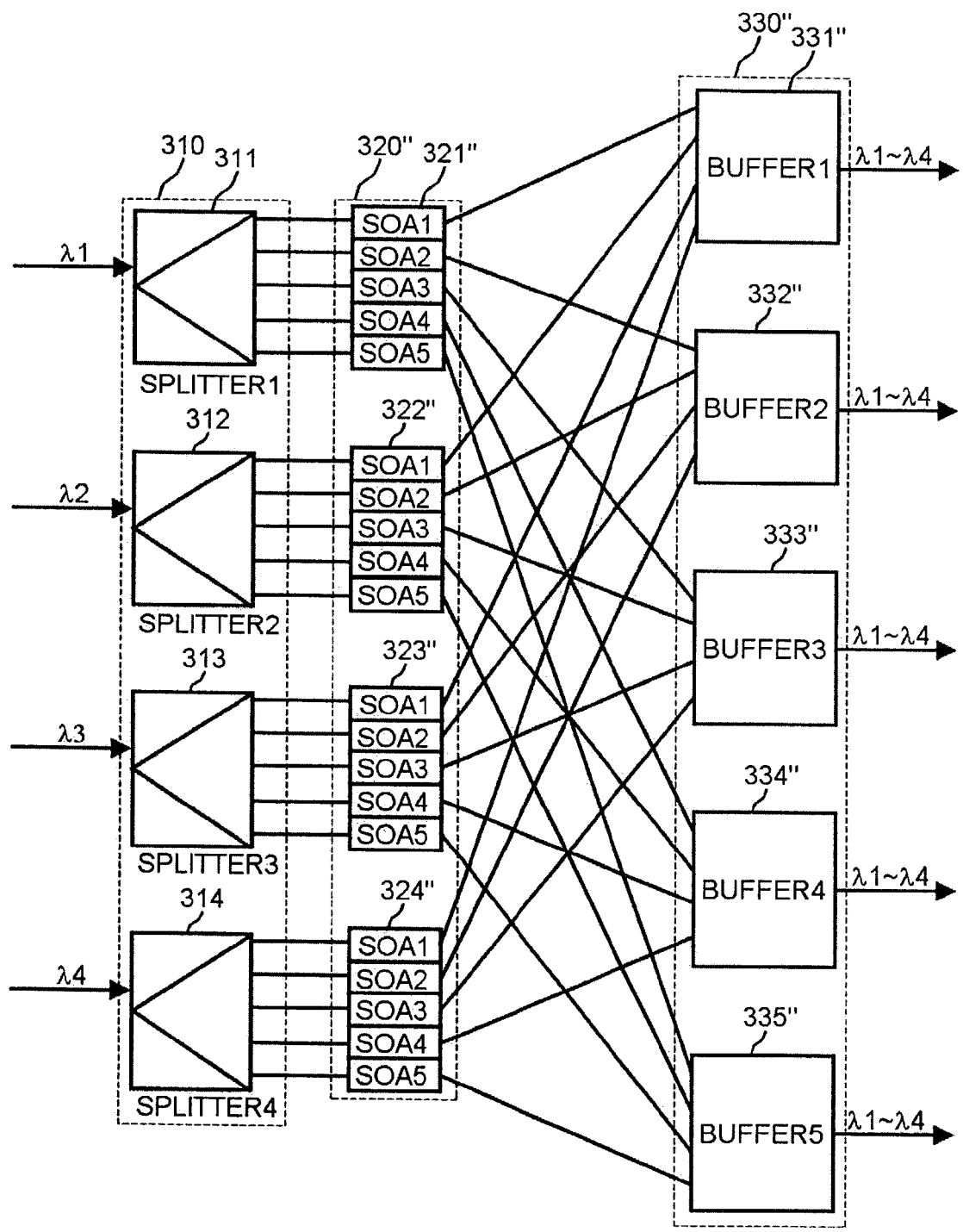
Figure 23:
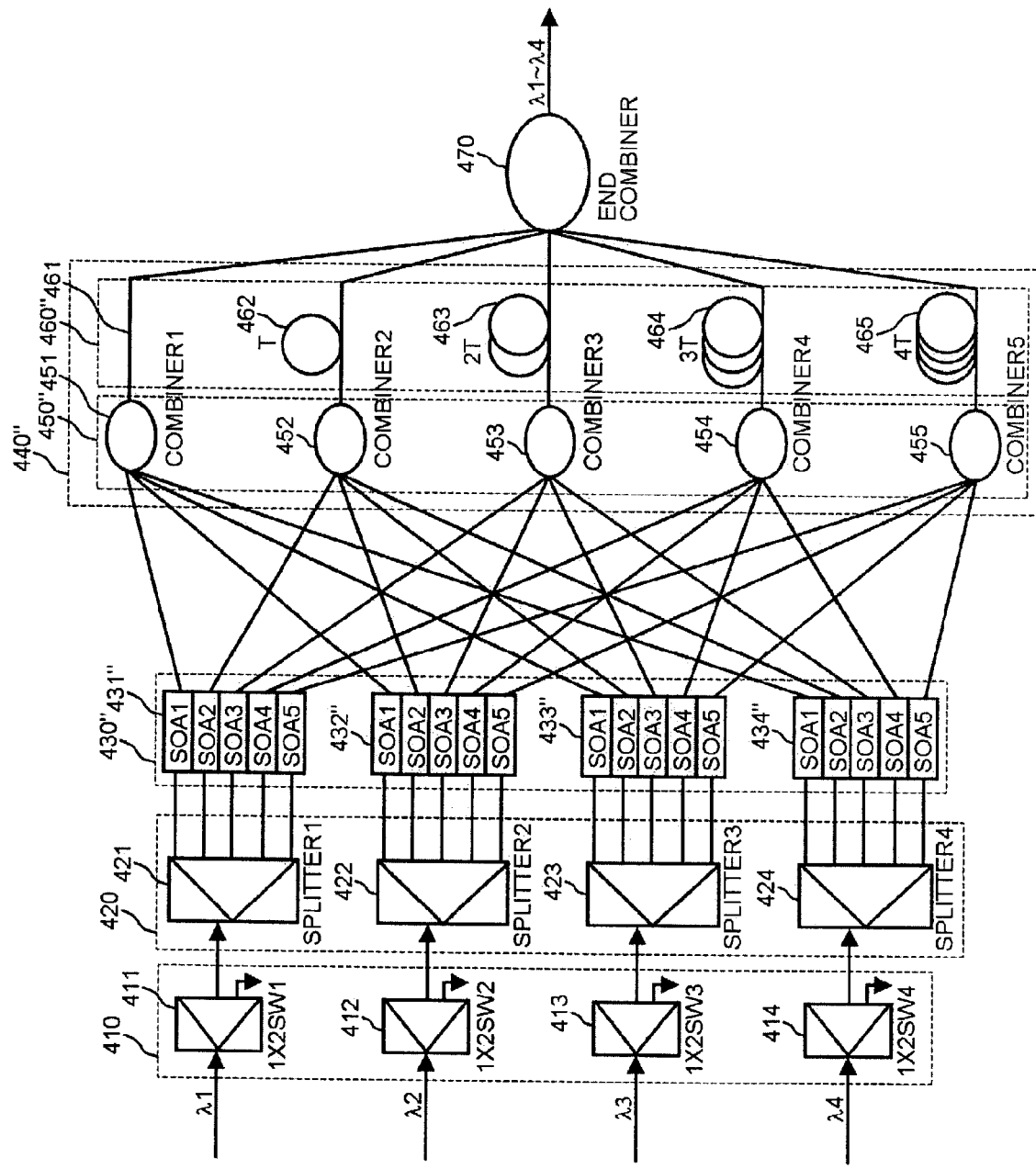

FIGS. 21 to 23 are drawings for illustrating link expandability of the optical switching system shown in FIG. 2. The optical switching system 200" shown in FIGS. 21 to 23 is constructed by additionally providing the optical switching system 200 with constituent components for link expansion. Therefore, hereinafter, overlapped description will be omitted and the same referential numerals will be used for the same constituent components.

Referring to FIG. 21, the optical switching system 200" is connected with five nodes 111 to 115 and supports communication between the nodes. The optical switching system 200" further comprises a fifth wavelength division demultiplexer 215 connected with the fifth node 115, a fifth coupler 235, a fifth switch block 255", a fifth FWC, FWC5, a fifth FWC array 265", and a fifth wavelength division multiplexer 275 connected with the fifth node 115. The fifth wavelength division demultiplexer 215 demultiplexes optical signals of channels input from the fifth node 115 connected thereto, thereby outputting four channels λ1 to λ4 which have different wavelengths. The fifth coupler 235 is interposed between the fifth wavelength division demultiplexer 215 and the fifth switch block 255", thereby partially splitting each of channels, which advance between the fifth wavelength division demultiplexer 215 and the fifth switch block 255". The fifth coupler 235 then outputs the split channels.

Referring to FIG. 22, each of the switch blocks 251" to 255" further comprises a fifth SOA, SOA5 and a fifth buffer 335". Each splitter 311 evenly splits an input channel into four and outputs the split channels. The four SOA gate arrays 321" to 324" are connected one-to-one with the four splitters 311 to 314. Each of the SOA gate array 321" to 324" comprises five SOA gates SOA1 to SOA5. The controller 240 outputs a control signal to the fifth SOA gate array 325, so that one SOA is switched on among the five SOAs, SOA1 to SOA5, which constitute corresponding one of the first to fifth SOA gate arrays 321" to 324". This enables the fifth channel λ5 to be directed toward its own destination.

Referring to FIG. 23, each of the buffers 331" to 334" further comprises a fifth SOA, SOA5, a fifth combiner 455, and a fifth delay line 465. Each of the splitters 421 to 424 evenly splits a corresponding channel input from the switches 411 to 424 into five and outputs the split channels. Each of SOA gate arrays 431" to 434" comprises five SOAs, SOA1 to SOA5. The controller 240 outputs a control signal into the fifth SOA gate array 435, so that one SOA gate is switched on among the five SOA gates, SOA1 to SOA5. This enables an input channel to pass through one of the five delay lines 461 to 465 having a delay time of 0 to 4T, respectively. The controller 240 outputs a control signal so that the channels directed toward a same destination are serially spread to have a time interval of at least T(>0), thereby not being overlapped. The fifth combiner 455 is connected with SOA5 of the first to fourth SOA gate arrays 431" to 434". The fifth delay line 465 which has a delay time of 4T is connected with the fifth combiner 455. The second combiner 470 collects and outputs five channels, which have passed through the five delay lines 461 to 465.

Referring to FIG. 21 again, the five FWC arrays 261" to 265" are connected one-to-one with the five switches 251" to 255". The fifth FWC array 265" converts the four channels with the different wavelengths input from the fifth switch block 255" into the fifth channel with the same wavelength.

The wavelength division multiplexing unit 270" functions to collect the channels wavelength-converted by the fixed wavelength converting unit 260" in accordance with destinations and then outputs the channels as multiplexed optical signals. The wavelength division multiplexing unit 270" comprises five wavelength division multiplexers 271 to 275. The wavelength division multiplexers 271 to 275 are connected one-to-one with the five nodes 111 to 115. The first wavelength division multiplexer 271 is connected with the first FWC, FWC1, the second wavelength multiplexer 272 is connected with the second FWC, FWC2, the third wavelength division multiplexer 273 is connected with the third FWC, FWC3, the fourth wavelength division multiplexer 274 is connected with the fourth FWC, FWC4, and the fifth wavelength division multiplexer 275 is connected with the fifth FWC, FWC 5.

It may be appreciated that it is possible to easily expand nodes while maintaining the existing node connection relationship as described above.

Meanwhile, if the numbers of wavelengths and the number of links are increased, fiber optic delay lines having a delay time of 0 to 4T may be insufficient to prevent the collision between channels. In order to solve this problem, the expansion of buffers is needed.

Figure 24:
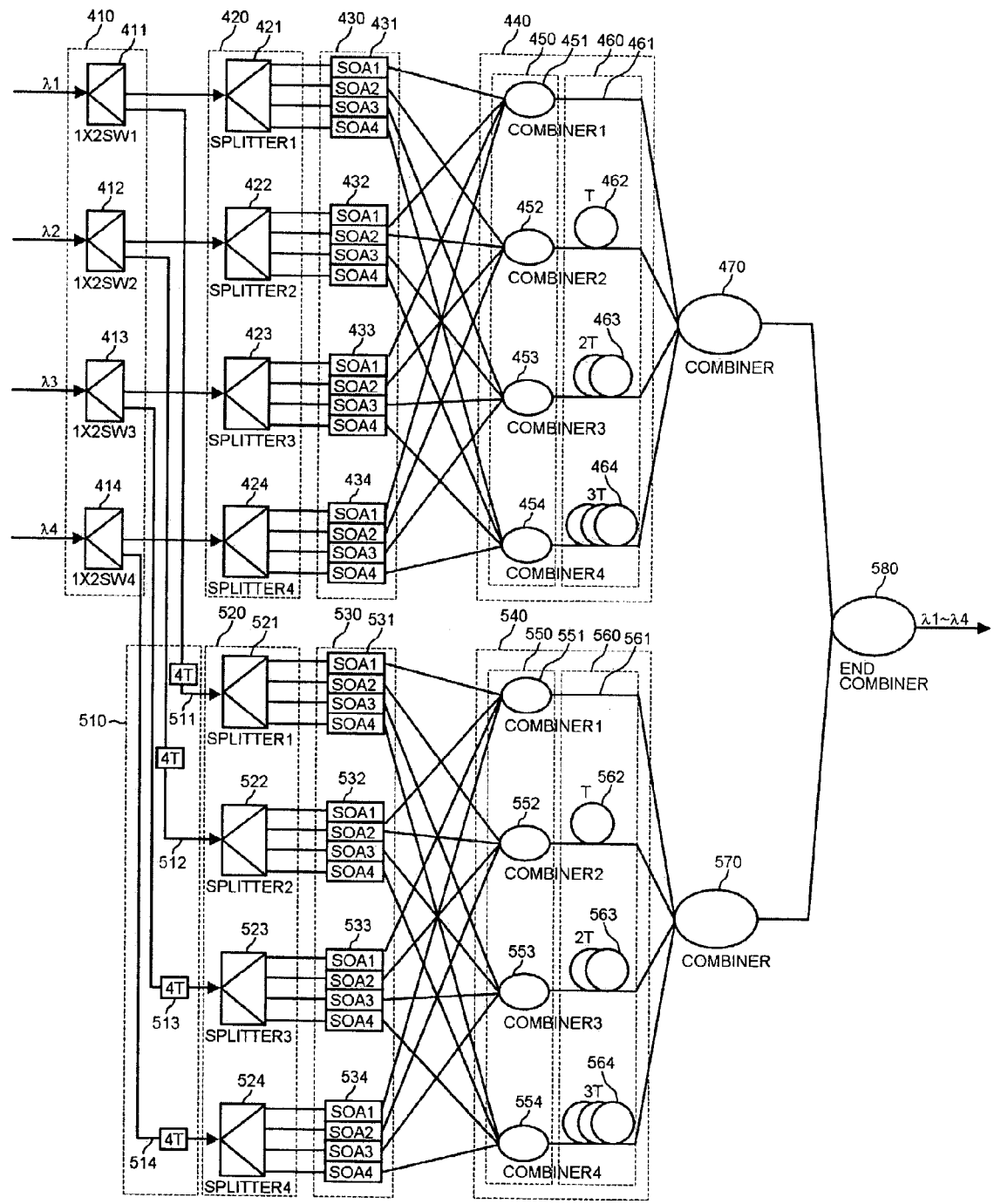
FIG. 24 is a drawing for illustrating the expandability of the buffer shown in FIG. 7.

FIG. 24 is a drawing for illustrating the expandability of a buffer shown in FIG. 7. The buffer shown in FIG. 24 is constructed by additionally providing the buffer shown in FIG. 7 with constituent components for expansion. Therefore, hereinafter, overlapped description will be omitted and the same reference numerals are used for the same constituent components. The buffer further comprises a second delay unit 510, a third splitting unit 520, a third selection unit 530, a third delay unit 540, a fourth combiner unit 570 and a fifth combiner unit 580. The third delay unit 540 comprises a third combiner unit 550 and a second delay routing unit 560. In addition, the third splitting unit 520, the third selection unit 530, the third delay unit 540, and the four combiner unit 570 are similar with the second splitting unit 420, the second selection unit 430, the first delay unit 440 and the second combiner unit 470, respectively.

The switches 411 to 414 each are input with channels of different wavelengths. The switches 411 to 414 each output an input channel to a first or second output end according to a control signal.

The second delay unit 510 functions to delay each channel output from an auxiliary switching unit by an allocated time and then to output the delayed channels. The second delay unit 510 includes four delay lines 511 to 514. The fifth delay lines 511 to 514 each have delay time of 4T and are connected one-to-one with the four switches 411 to 414.

The fifth combiner unit 580 combines and outputs the four channels λ1 to λ4 input from the first and second combiner units 470 and 570.

The controller 240 outputs control signals to each of the switches 411 to 414, so that an input channel is output to the first or second output end. The controller 240 outputs control signals so that the channels directed toward a same destination are serially spread to have a time interval of at least T (>0), thereby not being overlapped. That is, a channel output to the first output end of each of the switches 411 to 414 will have a time delay of 0 to 3T and a channel output to the second output end of each of the switches 411 to 414 will have a time delay of 4T to 7T.

Because the buffer has an overlapped construction as described above, it is easy to modulize the components added to the construction shown in FIG. 7. Furthermore, by merely adding such a module, it becomes possible to avoid the collision of channels which has been encountered in the existing construction.

As described above, the wavelength division multiplexing optical switching system has advantages in that the collision of channels is avoided by using small number of fiber optic delay lines corresponding to the number of wavelengths, while reducing total number of components. Because it is possible to individually modulize a switching unit, which uses splitters and SOAs, and a buffering unit, which uses fiber optic delay lines with a certain time interval, it is easy to perform expansion when the number of nodes or wavelengths increases, thereby reducing the costs.

In addition, because the wavelength division multiplexing optical switching system rearranges signals using a fixed wavelength converter which fixedly converts a wavelength into a specific wavelength instead of a variable wavelength converter which is difficult to be applied yet in view of wavelength converting time and stability, the collision problem can be stably solved and the switching of channels to destinations thereof can be smoothly performed. Furthermore, because a controller allows a desired destination node to be selected and a desired delay line can independently control each node without any associated relationship, the load of the entire system can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wavelength division multiplexing optical switching system which is connected with a plurality of nodes of an optical network and supports communication between the nodes, the optical switching system comprising:

a wavelength division demultiplexing unit which demultiplexes optical signals received from starting nodes and outputs channels with different wavelengths;

a routing unit which classifies the channels in accordance with destination nodes thereof;

a fixed wavelength converting unit which converts each set of the classified channels associated with corresponding starting node into channels of a single wavelength, the single wavelength being uniquely allocated to the corresponding starting node; and a wavelength division multiplexing unit which collects the channels outputted from the fixed wavelength converting unit in accordance with destinations nodes and then outputs multiplexed optical signals.

2. The optical switching system according to claim 1, wherein the wavelength division demultiplexing unit includes a plurality of waveguide gratings.

3. The optical switching system according to claim 1, wherein the routing unit comprises:

a branch unit which partially branches each of the channels and outputs the branched channels;

a switching unit which switches each channel to a route connected with its destination node according to a control signal; and a controller which receives destinations from each of the branched channels and outputs a control signal so that each channel advances to its own destination node.

4. The optical switching system according to claim 3, wherein the switching unit comprises:

a first splitting unit which splits each channel and outputs split channels;

a first selection unit which outputs only one or more of the split channels which advance to corresponding destinations nodes in accordance with a control signal; and a buffering unit which arranges the channels output from the first selection unit and directs the channels toward a destination node in time sequence.

5. The optical switching system according to claim 4, wherein the first splitting unit includes a plurality of splitters.

6. The optical switching system according to claim 4, wherein the first selection unit includes a plurality of semiconductor optical amplifier gate arrays.

7. The optical switching system according to claim 4, wherein the buffering unit comprises:

a second splitting unit which splits the channels directed to a same destination node and outputs split channels;

a second selection unit which outputs one or more of the split channels which advance to corresponding destinations nodes in accordance with a control signal;

a delay unit which delays each channel outputted from the second selection unit by an allocated time and outputs the delayed channels;

a combiner unit which collects and outputs channels input after having passed through the delay unit.

8. The optical switching system according to claim 7, wherein the second splitting unit includes a plurality of splitters.

9. The optical switching system according to claim 7, wherein the second selection unit includes a plurality of semiconductor optical amplifier gate arrays.

10. The optical switching system according to claim 1, further comprising:

a switching unit having a buffering unit, said buffering unit having an auxiliary switching unit.

11. A wavelength division multiplexing optical switching system which is connected with a plurality of nodes of an optical network and supports communication between the nodes, the optical switching system comprising:

a plurality of wavelength division demultiplexers which are one-to-one connected to starting nodes, the demultiplexers each demultiplexing an optical signal received from a connected starting node and outputs channels of different wavelengths;

a plurality of switch blocks which are one-to-one connected with the plurality of wavelength division demultiplexers, the switch blocks each classifying the channels input from corresponding wavelength division demultiplexer in accordance with destinations nodes thereof;

a plurality of fixed wavelength converter arrays which are one-to-one connected with the plurality of switch blocks, the fixed wavelength converter arrays each converting the channels input from corresponding switch blocks and associated with corresponding starting node into channels of a single wavelength, the single wavelength being uniquely allocated to the corresponding starting node; and a plurality of wavelength division multiplexers which are one-to-one connected with the plurality of nodes, the multiplexers each collecting the channels outputted from the fixed wavelength converter arrays in accordance with destination nodes and outputting the collected channels as multiplexed optical signals.

12. The optical switching system according to claim 11, further comprising:

a plurality of couplers each being interposed between a wavelength division demultiplexer and a switch block connected with each other, wherein the couplers each partially branch a channel which advances between the wavelength division demultiplexer and the switch block and outputs the branched channels; and a controller which receives destinations from the branched channels, wherein the controller outputs control signals to the plurality of switch blocks, so that each channel can advance to its destination.

13. The optical switching system according to claim 12, wherein each of the switch blocks comprises:

a plurality of first splitters, into which channels of different wavelengths are input from demultiplexers connected thereto, the splitters each splitting an input channel and outputting split channels;

a plurality of semiconductor optical amplifier (SOA) gate arrays which are one-to-one connected with the plurality of first splitters, in which the SOA gate arrays each switch on one SOA according to a control signal and each SOA is allocated a destination node connected thereto; and a plurality of buffers each being allocated a destination node connected thereto, the buffers each arranging in order of time sequence the channels directed to an allocated destination node.

14. The optical switching system according to claim 13, wherein each of the buffer comprises:

a plurality of splitters which split the channels each directed to an identical destination node and output split channels;

a plurality of SOA gate arrays which are one-to-one connected with the plurality of splitters, the SOA gate arrays each switching one SOA on in accordance with a control signal and the plurality of SOAs being allocated different delay times;

a plurality of delay lines each being connected with SOAs allocated an identical delay time among the plurality of SOA gate arrays, each delay line delaying an inputted channel by an allocated time and outputting the delayed channels; a plurality of combiners each collecting and outputting channels which have passed through the plurality of delay lines; and wherein the plurality of splitters split the channels each directed to an identical destination and output split channels.

15. The optical switching system according to claim 11, further comprising: a switching unit having a buffering unit, said buffering unit having an auxiliary switching unit.

* * * * *